(12) United States Patent
Inoue

(10) Patent No.: US 12,315,103 B2
(45) Date of Patent: May 27, 2025

(54) DISPLAY METHOD FOR AND DISPLAY APPARATUS

(71) Applicant: SEIKO EPSON CORPORATION, Tokyo (JP)

(72) Inventor: Kasumi Inoue, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 200 days.

(21) Appl. No.: 18/169,382

(22) Filed: Feb. 15, 2023

(65) Prior Publication Data

US 2023/0260079 A1 Aug. 17, 2023

(30) Foreign Application Priority Data

Feb. 15, 2022 (JP) ................. 2022-021067

(51) Int. Cl.
*G06T 3/20* (2006.01)
*G06F 3/01* (2006.01)

(52) U.S. Cl.
CPC ................ *G06T 3/20* (2013.01); *G06F 3/017* (2013.01)

(58) Field of Classification Search
CPC .................................. G06F 3/017; G06T 3/20
See application file for complete search history.

(56) References Cited

U.S. PATENT DOCUMENTS

| 2006/0192753 | A1 | 8/2006 | Fukuhara |
| 2010/0328209 | A1* | 12/2010 | Nakao ................... G06F 3/0488 345/157 |
| 2014/0092048 | A1* | 4/2014 | Yamamoto .......... A63F 13/2145 345/173 |
| 2016/0282958 | A1 | 9/2016 | Naess |
| 2017/0228033 | A1* | 8/2017 | Takimoto ............ G06F 3/04842 |
| 2020/0133433 | A1 | 4/2020 | Nakashin |
| 2021/0055630 | A1 | 2/2021 | Oike |

FOREIGN PATENT DOCUMENTS

| JP | 2006229621 A | 8/2006 |
| JP | 2010169986 A | 8/2010 |
| JP | 2014220792 A | 11/2014 |
| JP | 2016186678 A | 10/2016 |
| JP | 2020067909 A | 4/2020 |
| JP | 2021033554 A | 3/2021 |

* cited by examiner

*Primary Examiner* — Charles Tseng
(74) *Attorney, Agent, or Firm* — Dority & Manning, P.A.

(57) ABSTRACT

A display method including detecting a pointing element, and displaying an operation image containing a plurality of item images. When the pointing element includes the right hand, the plurality of item images are placed in the operation image based on a first aspect, and when the pointing element includes the left hand, the plurality of item images are placed in the operation image based on a second aspect.

9 Claims, 13 Drawing Sheets

DISPLAY METHOD FOR AND DISPLAY APPARATUS

The present application is based on, and claims priority from JP Application Serial Number 2022-021067, filed Feb. 15, 2022, the disclosure of which is hereby incorporated by reference herein in its entirety.

BACKGROUND

1. Technical Field

The present disclosure relates to a display method and a display apparatus.

2. Related Art

Display apparatuses having what is called an interactive function have been developed, which allow a user to perform operation, for example, write texts or draw pictures on the display screen by using an electronic pen, a finger, or any other pointing element. For example, JP A-2016-186678 discloses an interactive projector that detects the position of the tip of a pointing element to accept pointing operation from a user.

The same graphical user interface (GUI) is displayed on the display screen both when the pointing element includes the right hand and when the pointing element includes the left hand. There is therefore room for improvement in the operability of the GUI.

SUMMARY

A display method according to an aspect of the present disclosure includes detecting a pointing element, and displaying an operation image containing a plurality of item images. When the detected pointing element includes a right hand, the plurality of item images are placed in the operation image based on a first aspect, and when the detected pointing element includes a left hand, the plurality of item images are placed in the operation image based on a second aspect.

A display apparatus according to another aspect of the present disclosure includes a detection section that detects a pointing element, and a display control section that displays an operation image containing a plurality of item images. When the detected pointing element includes a right hand, the plurality of item images are placed in the operation image based on a first aspect, and when the detected pointing element includes a left hand, the plurality of item images are placed in the operation image based on a second aspect.

DESCRIPTION OF EXEMPLARY EMBODIMENTS

Figure 1:
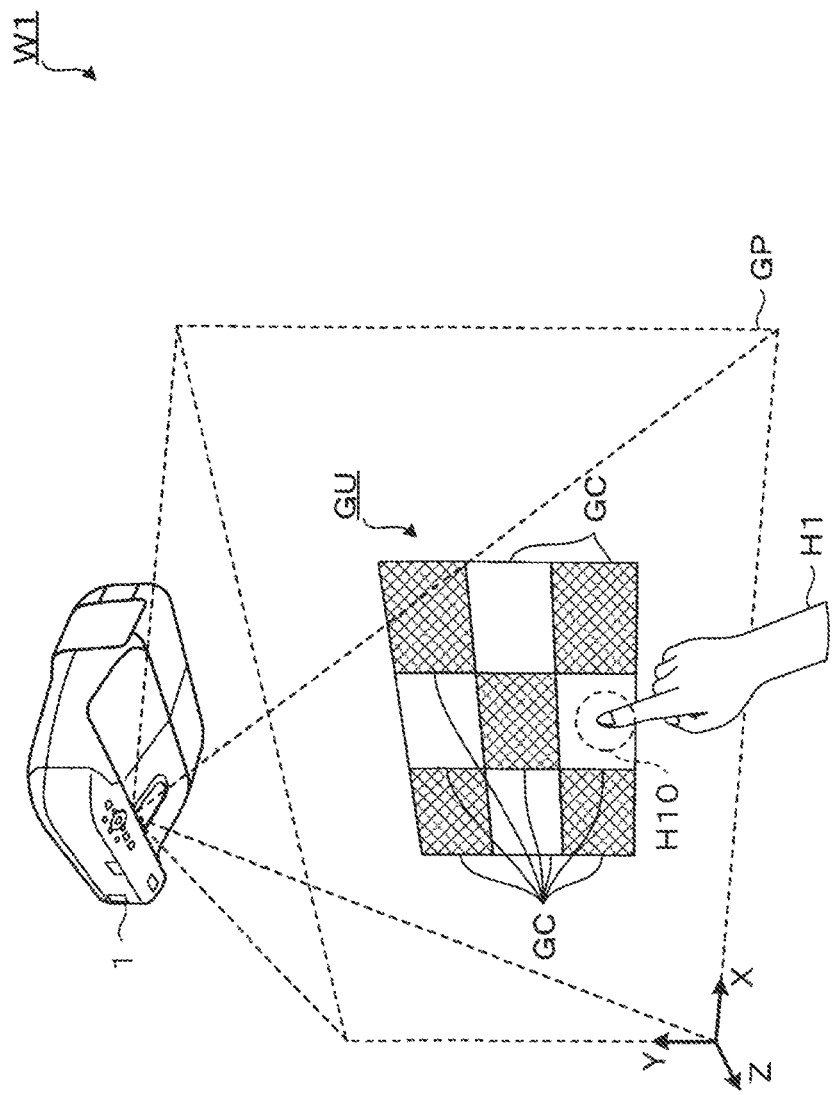
FIG. 1 is a diagrammatic view for describing an overview of a projector according to a first embodiment.

Preferable embodiments according to the present disclosure will be described below with reference to the accompanying drawings. In the drawings, the dimensions and scale of each portion differ from actual values in some cases, and some of the portions are diagrammatically drawn for ease of understanding. The scope of the present disclosure is not limited to the embodiments unless particular restrictions on the present disclosure are made in the following description.

1. First Embodiment

In a first embodiment, a display method and a display apparatus according to the present disclosure will be described by presenting by way of example a projector that changes a GUI in accordance with whether a user uses the right hand or the left hand to perform pointing operation on the GUI.

1.1. Overview of Projector

FIG. 1 is a diagrammatic view for describing an overview of a projector 1 according to the first embodiment. It is assumed in the present embodiment that the projector 1 projects projection light for displaying a projection image GP on a wall surface W1. The projection image GP is a generic term for an image displayed by the projector 1 through projection of the projection light onto a display surface. In the present embodiment, the projection image GP may contain an operation image GU, which allows the user to perform input operation on the projector 1. The operation image GU is a GUI containing a plurality of item images GC. In the present embodiment, the operation image GU is an image having a rectangular contour. The item images GC are each an image relating to a process executed by the projector 1. The user of the projector 1, for example, performs pointing operation on one of the plurality of item images GC with a fingertip H10 of a right hand H1, which is a pointing element, to cause the projector 1 to execute a process corresponding to the one item image GC.

It is assumed in the present embodiment that the user of the projector 1 directly faces the wall surface W1, more specifically, the projection image GP displayed on the wall surface W1. It is further assumed in the present embodiment that the wall surface W1 is provided in parallel to axes X and Y. The axis Y is assumed to be an axis parallel to the vertical direction. Out of the directions parallel to the axis Y, the vertical direction is called a direction −Y, and the opposite direction of the direction −Y is called a direction +Y. It is further assumed that the axis X is perpendicular to the axis Y and parallel to the wall surface W1. Out of the directions parallel to the axis X, the rightward direction viewed from the user is called a direction +X, and the opposite direction of the direction +X is called a direction −X. An axis perpendicular to the axes X and Y is referred to as an axis Z. The axis Z is perpendicular to the wall surface W1. Out of the directions parallel to the axis Z, the direction from the wall surface W1 toward the user is called a direction +Z, and the opposite direction of the direction +Z is called a direction −Z. That is, the user who faces the direction −Z directly faces the projection image GP displayed on the wall surface W1. It is further assumed that the projection image GP is displayed as a rectangle having two sides parallel to the axis X and two sides parallel to the axis Y. In the present embodiment, the directions +Y, −Y, +X, and −X may be referred to as an "upward direction viewed from the user", a "downward direction viewed from the user", a "rightward direction viewed from the user", and a "leftward direction viewed from the user". In the description of the positional relationship between two different points, a situation in which one of the points is located in a position shifted from the other in the direction +Y may be referred to as a situation in which "one of the points is located upward from the other when viewed from the user". Similarly, a situation in which one of the points is located in a position shifted from the other in the direction −X may be referred to as a situation in which "one of the points is located leftward from the other when viewed from the user".

1.2. Features of Operation Image and Display Method

Figure 2:
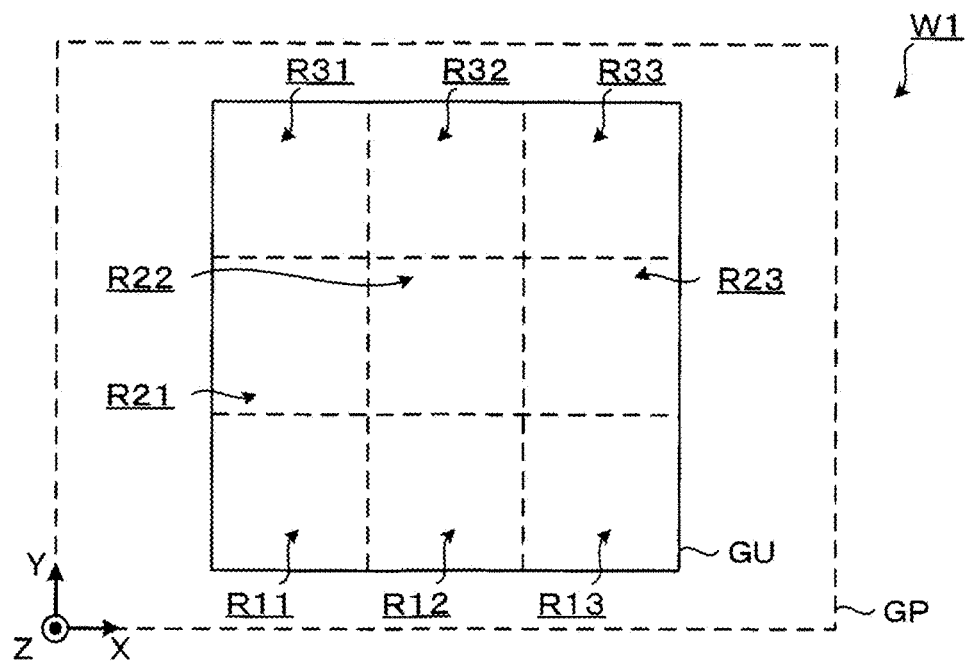
FIG. 2 is a diagrammatic view for describing a plurality of regions of an operation image.

FIG. 2 is a diagrammatic view for describing a plurality of regions of the operation image GU. In the present embodiment, the operation image GU has regions R11, R12, R13, R21, R22, R23, R31, R32, and R33. It is assumed for convenience that the regions R11, R12, R13, R21, R22, R23, R31, R32, and R33 have the same dimensions and area.

The regions R21, R22, and R23 are shifted from the regions R11, R12, and R13 in the direction +Y. In other words, the regions R21, R22, and R23 are located in positions shifted upward from the regions R11, R12, and R13 when viewed from the user.

The regions R31, R32, and R33 are shifted from the regions R21, R22, and R23 in the direction +Y. In other words, the regions R31, R32, and R33 are located in positions shifted upward from the regions R21, R22, and R23 when viewed from the user. The regions R31, R32, and R33 are also located in positions shifted upward from the regions R11, R12, and R13 when viewed from the user.

The regions R12, R22, and R32 are shifted from the regions R11, R21, and R31 in the direction +X. In other words, the regions R11, R21, and R31 are located in positions shifted leftward from the regions R12, R22, and R32 when viewed from the user.

The regions R13, R23, and R33 are shifted from the regions R12, R22, and R32 in the direction +X. In other words, the regions R12, R22, and R32 are located in positions shifted leftward from the regions R13, R23, and R33 when viewed from the user. The regions R11, R21, and R31 are also located in positions shifted leftward from the regions R13, R23, and R33 when viewed from the user.

An operation image GU1 displayed when the user performs input operation on the projector 1 by using the right hand H1 will be described below with reference to FIGS. 3 and 4.

Figure 3:
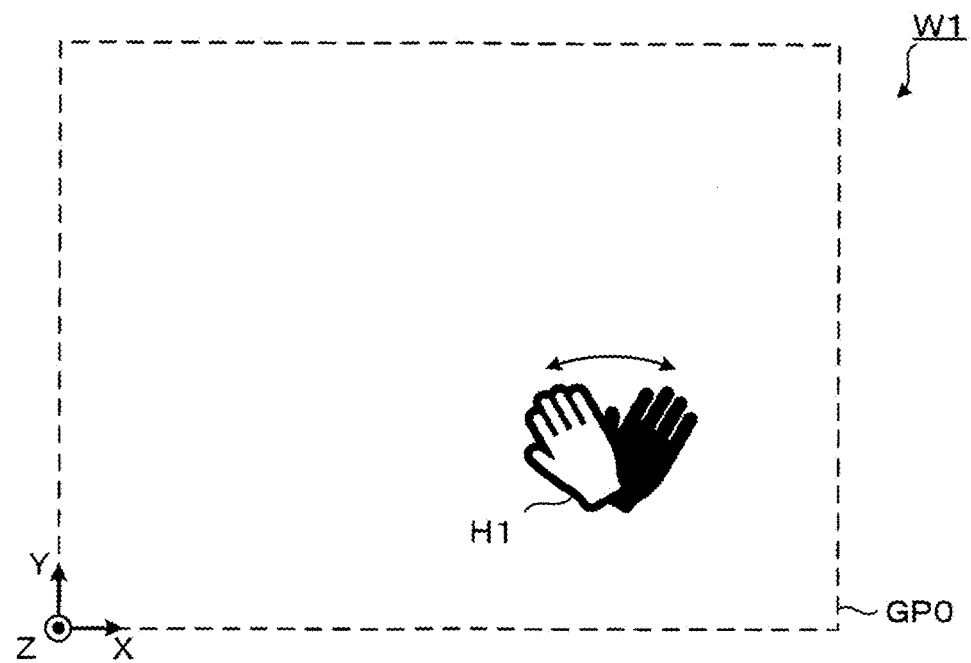
FIG. 3 is a descriptive diagram illustrating how a user uses the right hand to display the operation image.

FIG. 3 is a descriptive diagram illustrating how the user uses the right hand H1 to display the operation image GU1. In FIG. 3, the projector 1 displays a projection image GP0 on the wall surface W1. The projection image GP0 is an image that does not contain the operation image GU. The user moves the right hand H1, which is the pointing element, to the vicinity of the region where the projection image GP0 is displayed to cause the projector 1 to detect the right hand H1.

Figure 4:
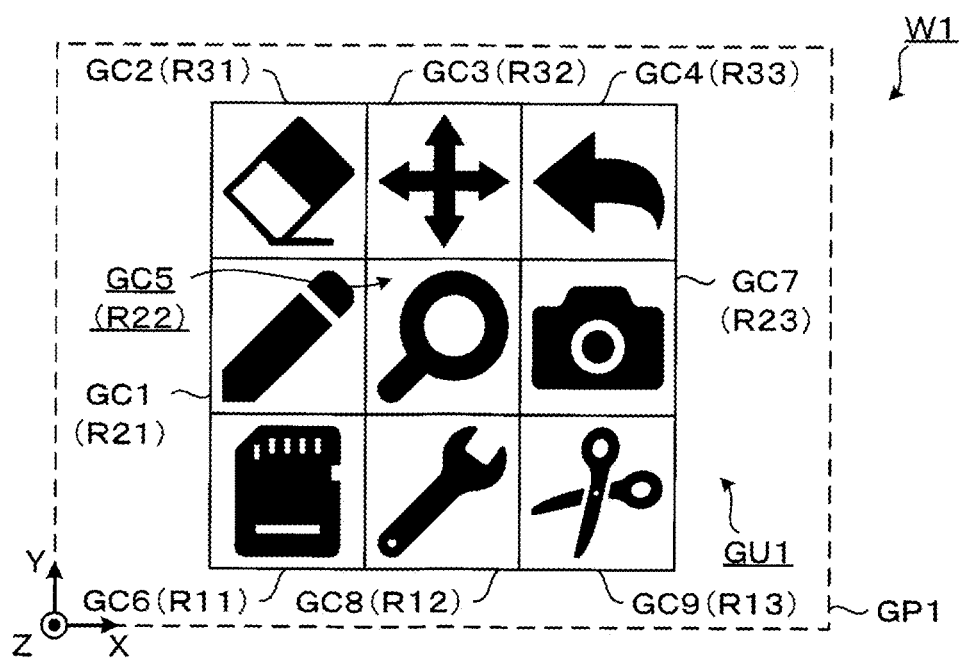
FIG. 4 is a diagrammatic view for describing the operation image.

FIG. 4 is a diagrammatic view for describing the operation image GU1. When detecting the right hand H1, the projector 1 displays a projection image GP1 on the wall surface W1. The projection image GP1 is an image containing the operation image GU1. The operation image GU1 is a GU1 containing item images GC1 to GC9.

The item image GC1 is, for example, an item image relating to a drawing tool call-up process. In the operation image GU1, the item image GC1 is placed in the region R21.

The item image GC2 is, for example, an item image relating to an eraser tool call-up process. In the operation image GU1, the item image GC2 is placed in the region R31.

The item image GC3 is, for example, an item image relating to a movement tool call-up process. In the operation image GU1, the item image GC3 is placed in the region R32.

The item image GC4 is, for example, an item image relating to a redoing process. In the operation image GU1, the item image GC4 is placed in the region R33.

The item image GC5 is, for example, an item image relating to a screen enlargement tool call-up process. In the operation image GU1, the item image GC5 is placed in the region R22.

The item image GC6 is, for example, an item image relating to a saving process. In the operation image GU1, the item image GC6 is placed in the region R11.

The item image GC7 is, for example, an item image relating to a screen capture process. In the operation image GU1, the item image GC7 is placed in the region R23.

The item image GC8 is, for example, an item image relating to a setting screen call-up process. In the operation image GU1, the item image GC8 is placed in the region R12.

The item image GC9 is, for example, an item image relating to a cutting tool call-up process. In the operation image GU1, the item image GC9 is placed in the region R13.

That is, in the operation image GU1, the item image GC2 placed in the region R31 is placed leftward from the item image GC4, which is placed in the region R33, when viewed from the user.

The item image GC1 placed in the region R21 is placed leftward from the item image GC7, which is placed in the region R23, when viewed from the user.

It is assumed in the present embodiment that the eraser tool call-up process is a more frequently executed process than the redoing process.

It is further assumed that the drawing tool call-up process is a more frequently executed process than the eraser tool call-up process.

It is still further assumed that the drawing tool call-up process is a more frequently executed process than the screen capture process.

An operation image GU2 displayed when the user performs input operation on the projector 1 by using the left hand H2 will be described below with reference to FIGS. 5 and 6.

Figure 5:
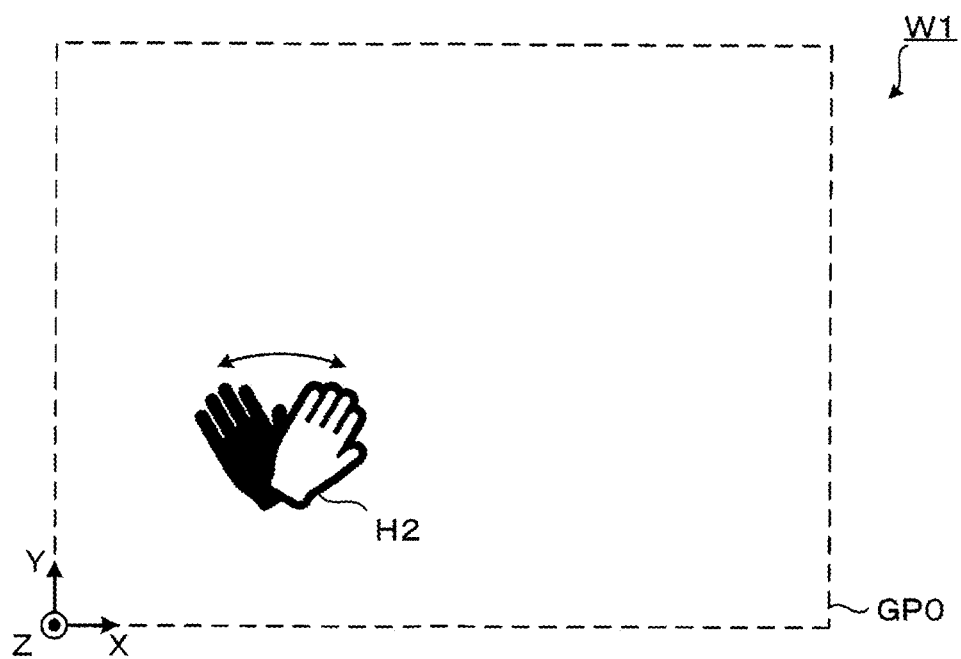
FIG. 5 is a descriptive diagram illustrating how the user uses the left hand to display another operation image.

FIG. 5 is a descriptive diagram illustrating how the user uses the left hand H2 to display the operation image GU2. In FIG. 5, the projector 1 displays the projection image GP0 on the wall surface W1. The projection image GP0 is an image that does not contain the operation image GU, as described above. The user moves the left hand H2, which is the pointing element, to the vicinity of the region where the projection image GP0 is displayed to cause the projector 1 to detect the left hand H2.

Figure 6:
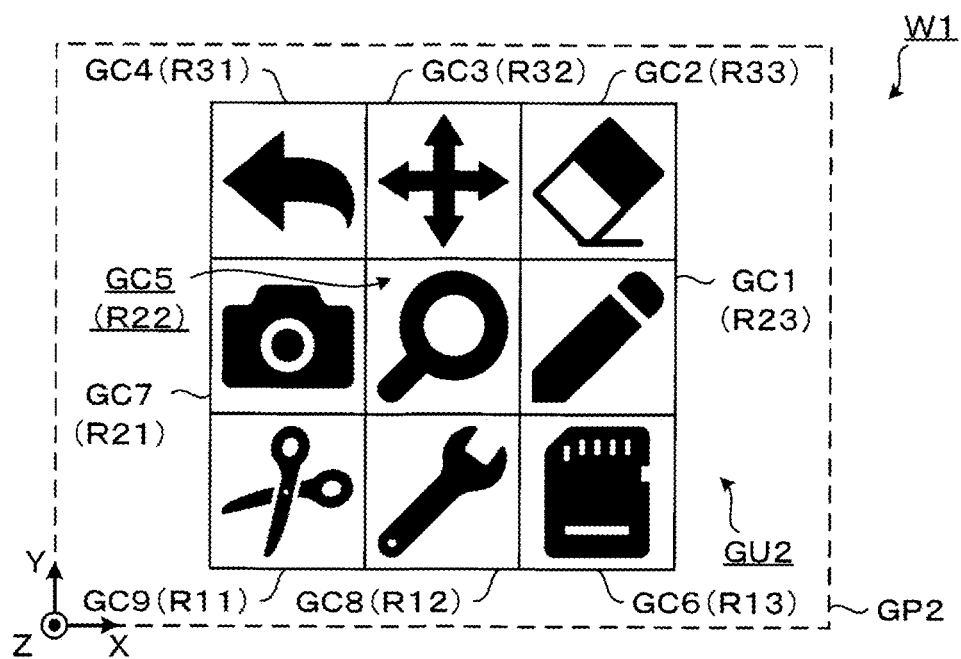
FIG. 6 is a diagrammatic view for describing the other operation image.

FIG. 6 is a diagrammatic view for describing the operation image GU2. When detecting the left hand H2, the projector 1 displays a projection image GP2 on the wall surface W1. The projection image GP2 is an image containing the operation image GU2. The operation image GU2 is a GUI containing the item images GC1 to GC9, as the operation image GU1 is.

In the operation image GU2, the item image GC1 is placed in the region R23.

In the operation image GU2, the item image GC2 is placed in the region R33.

In the operation image GU2, the item image GC3 is placed in the region R32.

In the operation image GU2, the item image GC4 is placed in the region R31.

In the operation image GU2, the item image GC5 is placed in the region R22.

In the operation image GU2, the item image GC6 is placed in the region R13.

In the operation image GU2, the item image GC7 is placed in the region R21.

In the operation image GU2, the item image GC8 is placed in the region R12.

In the operation image GU2, the item image GC9 is placed in the region R11.

That is, in the operation image GU2, the item image GC2 placed in the region R33 is placed rightward from the item image GC4, which is placed in the region R31, when viewed from the user.

The item image GC1 placed in the region R23 is placed rightward from the item image GC7, which is placed in the region R21, when viewed from the user.

An operation image GU3 displayed when the user performs input operation on the projector 1 by using a pointing element H9 will be described below with reference to FIGS. 7 and 8.

Figure 7:
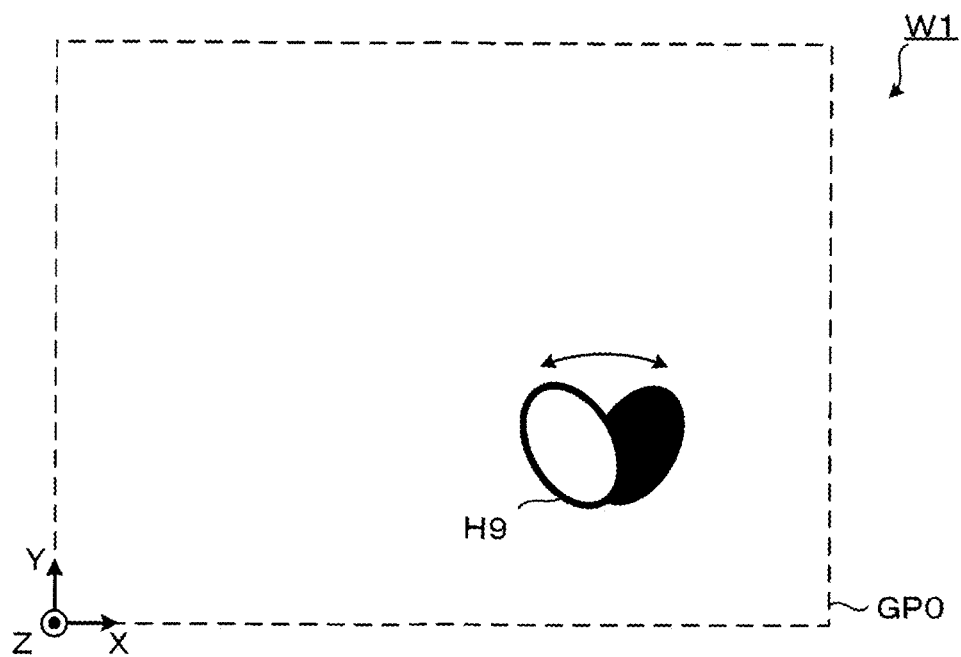
FIG. 7 is a descriptive diagram illustrating how the user uses a pointing element to display still another operation image.

FIG. 7 is a descriptive diagram illustrating how the user uses the pointing element H9 to display the operation image GU3. In FIG. 7, the projector 1 displays the projection image GP0 on the wall surface W1. The projection image GP0 is an image that does not contain the operation image GU, as described above. The user moves the pointing element H9 to the vicinity of the region where the projection image GP0 is displayed to cause the projector 1 to detect the pointing element H9.

Figure 8:
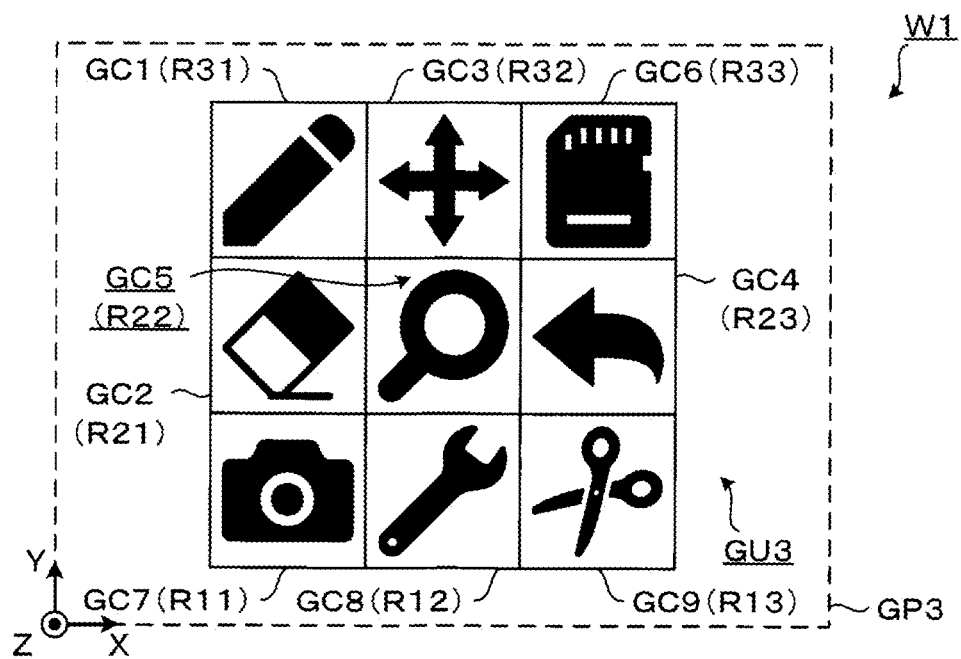
FIG. 8 is a diagrammatic view for describing the still other operation image.

FIG. 8 is a diagrammatic view for describing the operation image GU3. When detecting the pointing element H9, the projector 1 displays the projection image GP3 on the wall surface W1. The projection image GP3 is an image containing the operation image GU3. The operation image GU3 is a GUI containing the item images GC1 to GC9, as the operation images GU1 and GU2 are.

The pointing element H9 is, for example, a pointing stick used by the user when the user performs pointing operation on the operation image GU from a position where the user's hand cannot reach the wall surface W1. When the user moves the pointing element H9 to the vicinity of the region where the projection image GP0 is displayed, the projector 1 detects the pointing element H9 as a pointing element including none of the right hand H1 and the left hand H2. In other words, even in the case where the user uses the right hand H1 or the left hand H2 as the pointing element, when the projector 1 detects the pointing element including none of the right hand H1 and the left hand H2, the operation image GU3 is displayed on the wall surface W1.

In the operation image GU3, the item image GC1 is placed in the region R31.

In the operation image GU3, the item image GC2 is placed in the region R21.

In the operation image GU3, the item image GC3 is placed in the region R32.

In the operation image GU3, the item image GC4 is placed in the region R23.

In the operation image GU3, the item image GC5 is placed in the region R22.

In the operation image GU3, the item image GC6 is placed in the region R33.

In the operation image GU3, the item image GC7 is placed in the region R11.

In the operation image GU3, the item image GC8 is placed in the region R12.

In the operation image GU3, the item image GC9 is placed in the region R13.

That is, in the operation image GU3, the item image GC1, which is placed in the region R31, is placed upward from the item image GC2, which is placed in the region R21, when viewed from the user.

The item image GC1, which is placed in the region R31, is placed upward from the item image GC7, which is placed in the region R11, when viewed from the user.

Figure 9:
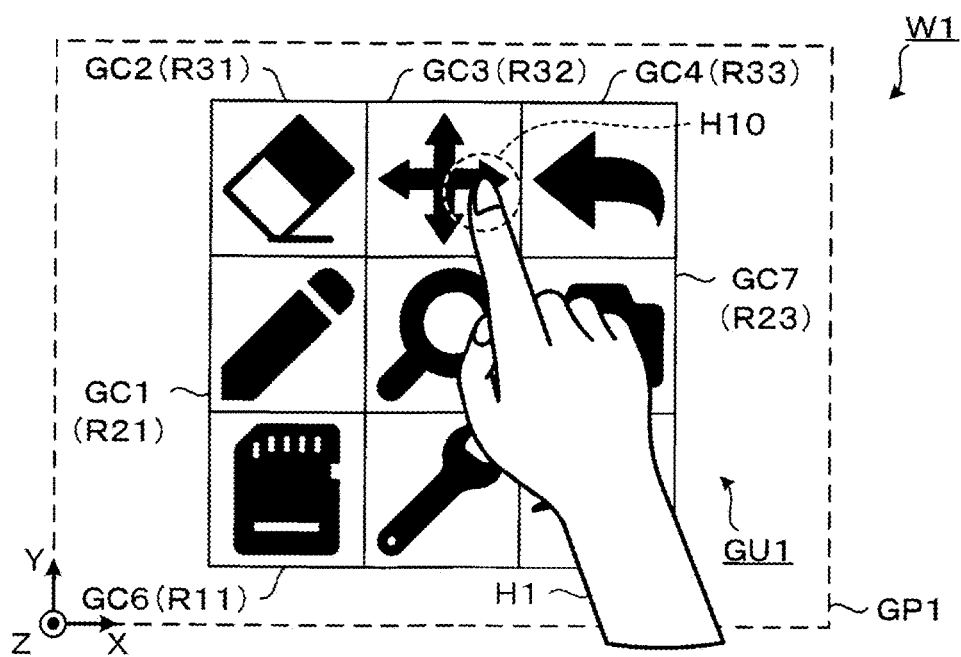
FIG. 9 is a descriptive diagram illustrating how the user uses the right hand to perform pointing operation on the operation image.

FIG. 9 is a descriptive diagram illustrating how the user uses the right hand H1 to perform pointing operation on the operation image GU1. The user selects one of the plurality of item images GC contained in the operation image GU1 and uses the fingertip H10 of the right hand H1 to perform pointing operation on the one item image GC to cause the projector 1 to execute a process corresponding to the one item image GC. At this point, the projector 1 detects an pointing position to which the fingertip H10 of the right hand H1 points as the pointing position to which the pointing element points. Since the detected pointing position falls within the region where one of the plurality of item images GC is displayed, the projector 1 executes a process corresponding to the one item image GC. For example, when the user points to the item image GC3 by using the fingertip H10 of the right hand H1, the projector 1 detects that the XY coordinate of the pointing position to which the fingertip H10 of the right hand H1 points falls within the region R32. The projector 1 then executes the movement tool call-up process, which corresponds to the item image GC3 displayed in region R32.

When the user performs pointing operation on the operation image GU, part of the plurality of item images GC contained in the operation image GU may be hidden behind the pointing element when viewed from the user. For example, FIG. 9, which shows the operation image GU1, shows that the item image GC7 placed in the region R23 is hidden behind the right hand H1. The user therefore cannot readily visually recognize the item image GC7 hidden behind the right hand H1, and it takes time in some cases for the user to grasp the position of the item image GC7.

On the other hand, FIG. 9 shows that the item image GC1 placed in the region R21 is not hidden behind the right hand H1. The projection image GP is typically displayed at a level approximately flush with or above the level of the user's face. In the case where the position where the projection image GP1 is displayed is approximately flush with or above the level of the user's face, and when the user performs pointing operation on the operation image GU1 with the right hand H1, the right hand H1 extends from a lower right point toward an upper left point when viewed from the user. Since the region R21 is located leftward from the region R23, the item image GC1 placed in the region R21 is less unlikely to be hidden behind the right hand H1 than the item image GC7 placed in the region R23. That is, in the operation image GU1, since the item image GC1, which relates to the drawing tool call-up process executed more frequently than the screen capture process, is displayed in a position shifted leftward from the item image GC7 relating to the screen capture process, the user can readily grasp the position of the item image GC1, to which the user frequently points. Similarly, since the item image GC2, which relates to the eraser tool call-up process executed more frequently than the redoing process, is displayed in a position shifted leftward from the item image GC4 relating to the redoing process, the user can readily grasp the position of the item image GC2, to which the user frequently points.

In the case where the position where the projection image GP2 is displayed is approximately flush with or above the level of the user's face, and when the user performs pointing operation on the operation image GU2 with the left hand H2, the left hand H2 extends from a lower left point toward an upper right point when viewed from the user. Since the region R23 is located rightward from the region R21, the item image GC1 placed in the region R23 is less unlikely to be hidden behind the left hand H2 than the item image GC7 placed in the region R21. That is, in the operation image GU2, since the item image GC1, which relates to the drawing tool call-up process executed more frequently than the screen capture process, is displayed in a position shifted rightward from the item image GC7 relating to the screen capture process, the user can readily grasp the position of the item image GC1, to which the user frequently points. Similarly, since the item image GC2, which relates to the eraser tool call-up process executed more frequently than the redoing process, is displayed in a position shifted rightward from the item image GC4 relating to the redoing process, the user can readily grasp the position of the item image GC2, to which the user frequently points.

In the case where the position where the projection image GP3 is displayed is approximately flush with or above the level of the user's face, and when the user performs pointing operation on the operation image GU3 with the pointing element H9, the pointing element H9 is generally considered to extend from a lower point toward an upper point when viewed from the user. Since the region R31 is located upward from the region R11, the item image GC1 placed in the region R31 is less unlikely to be hidden behind the pointing element H9 than the item image GC7 placed in the region R11. That is, in the operation image GU3, since the item image GC1, which relates to the drawing tool call-up process executed more frequently than the screen capture process, is displayed in a position shifted upward from the item image GC7 relating to the screen capture process, the user can readily grasp the position of the item image GC1, to which the user frequently points. Similarly, since the item image GC1, which relates to the drawing tool call-up process executed more frequently than the eraser tool call-up process, is displayed in a position shifted upward from the item image GC2 relating to the eraser tool call-up process, the user can readily grasp the position of the item image GC1, to which the user frequently points.

1.3. Configuration and Function of Projector

The configuration and function of the projector 1 according to the first embodiment will be described below with reference to FIGS. 10 to 11.

Figure 10:
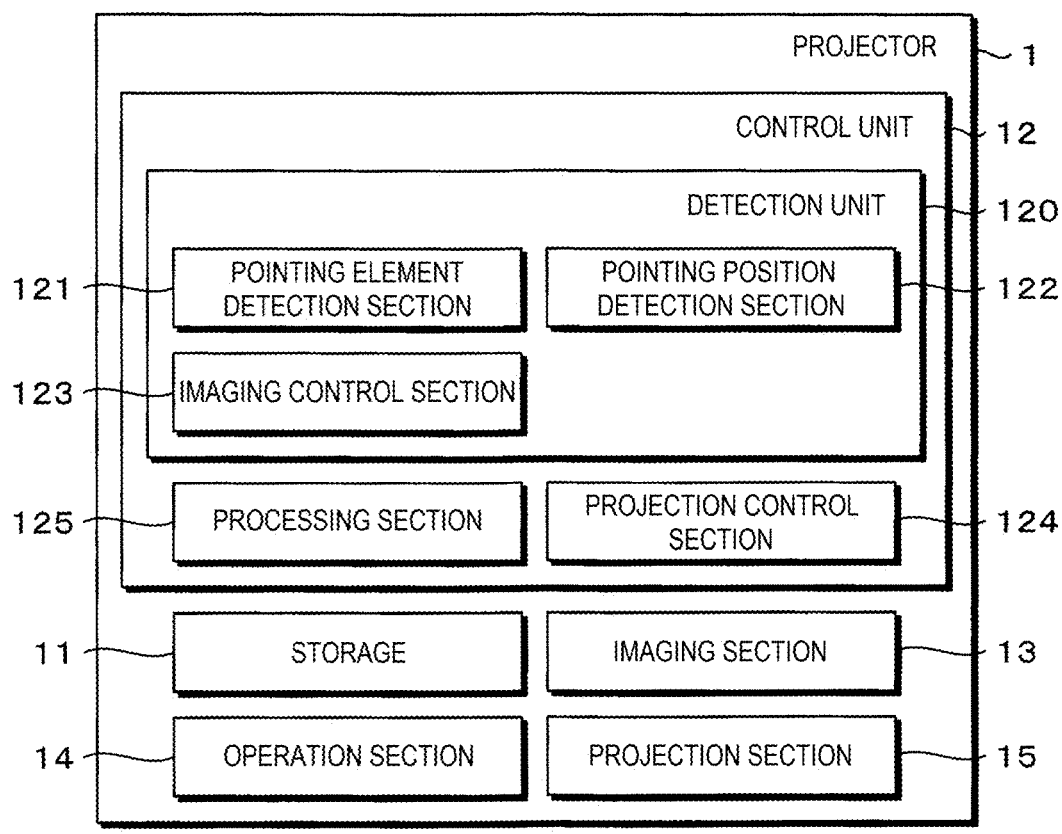
FIG. 10 is a block diagram showing the configuration of the projector according to the first embodiment.

FIG. 10 is a block diagram showing the configuration of the projector 1 according to the first embodiment. The projector 1 includes a storage 11, which stores a variety of pieces of information, a control unit 12, which controls the action of the projector 1, an imaging section 13, which performs imaging for detecting the pointing element, an operation section 14, which accepts input operation from the user of the projector 1, and a projection section 15, which displays an image on the display surface by projecting the projection light. The control unit 12 has the functions as a detection unit 120, a projection control section 124, and a processing section 125. The detection unit 120 has the functions as a pointing element detection section 121, a pointing position detection section 122, and an imaging control section 123.

The storage 11 includes, for example, a volatile memory, such as a RAM, and a nonvolatile memory, such as a ROM. RAM is an abbreviation for a random access memory. ROM is an abbreviation for a read only memory.

Figure 11:
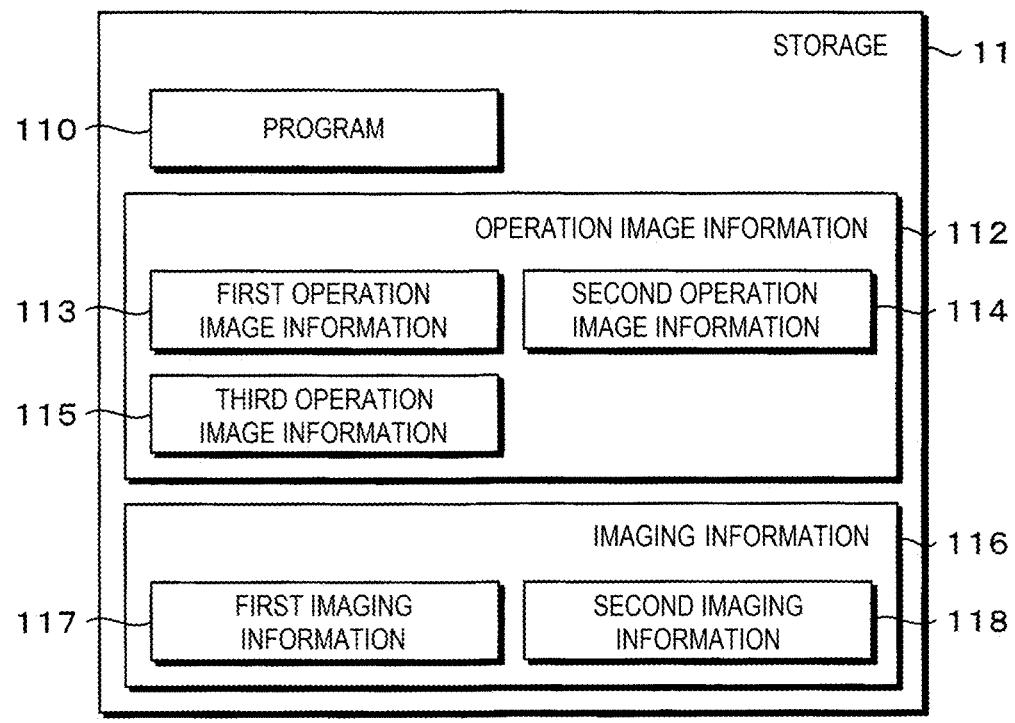
FIG. 11 is a block diagram showing the configuration of a storage according to the first embodiment.

FIG. 11 is a block diagram showing the configuration of the storage 11 according to the first embodiment. The nonvolatile memory provided in the storage 11 stores a program 110, which specifies the action of the projector 1, operation image information 112 representing the operation image GU, and an imaging information 116 used to detect the pointing element. In the present embodiment, the operation image information 112 contains first operation image information 113, second operation image information 114, and third operation image information 115. The first operation image information 113 is information representing the operation image GU1. The second operation image information 114 is information representing the operation image GU2. The third operation image information 115 is information representing the operation image GU3. The imaging information 116 contains first imaging information 117 and second imaging information 118.

The operation image information 112 can be changed in any manner, for example, by the user through editing operation performed on the operation section 14. That is, the user can change the arrangement, colors, sizes, and other factors of the item images GC contained in the operation image GU by editing the operation image information 112.

The volatile memory provided in the storage 11 is also used by the control unit 12 as a work area when the control unit 12 executes the program 110.

Part or entirety of the storage 11 may be provided in an external storage apparatus, an external server, or any other apparatus. Part or entirety of the variety of pieces of information stored in the storage 11 may be stored in the storage 11 in advance, or may be acquired from the external storage apparatus, the external server, or any other apparatus.

The control unit 12 includes one or more CPUs. It is, however, noted that the control unit 12 may include a programmable logic device, such as an FPGA, in place of or in addition to the CPU. The CPU is an abbreviation for a central processing unit, and FPGA is an abbreviation for a field-programmable gate array.

The control unit 12 functions as the detection unit 120, the projection control section 124, and the processing section 125 shown in FIG. 10 when the CPU or any other component provided in the control unit 12 executes the program 110 and operates in accordance with the program 110. The detection unit 120 specifically functions as the pointing element detection section 121, the pointing position detection section 122, and the imaging control section 123.

The detection unit 120 detects the pointing element. The detection unit 120 further detects the type of the pointing element. The detection unit 120 additionally detects the pointing position to which the pointing element points. The phrase "detects the type of the pointing element" means, for example, determining whether the pointing element includes the right hand H1, the left hand H2, or none of the right hand H1 and the left hand H2. The phrase "detects the pointing position to which the pointing element points" means, for example, identifying the XY coordinates of the location where the pointing element is in contact with the wall surface W1.

The imaging control section 123 controls the imaging section 13 to capture an image of the range containing the region, of the wall surface W1, on which the projection image GP is displayed, and the space in the vicinity of the region of the wall surface W1. The imaging control section 123 then acquires from the imaging section 13 the imaging information 116 representing the result of the imaging of the range containing the region, of the wall surface W1, on which the projection image GP is displayed, and the space in the vicinity of the region of the wall surface W1. The imaging control section 123 causes the storage 11 to store the acquired imaging information 116. In the present embodiment, the imaging control section 123 acquires the first imaging information 117 and the second imaging information 118 as the imaging information 116. The imaging control section 123 then causes the storage 11 to store the acquired first imaging information 117 and second imaging information 118. The first imaging information 117 and the second imaging information 118 are acquired at different timings. The space in the vicinity of the region, of the wall surface W1, where the projection image GP is displayed is, for example, the space containing the range from the region of the wall surface W1 to a region separate therefrom by a predetermined distance in the direction +Z.

The pointing element detection section 121 evaluates based on the imaging information 116 whether the pointing element is contained in the captured image indicated by the imaging information 116. When the pointing element is contained in the captured image indicated by the imaging information 116, that is, when the pointing element is detected, the pointing element detection section 121 evaluates based on the imaging information 116 whether the pointing element includes the right hand H1, the left hand H2, or none of the right hand H1 and the left hand H2. In the present embodiment, the pointing element detection section 121 evaluates based on the first imaging information 117 whether the pointing element is contained in the captured image indicated by the first imaging information 117. When the pointing element is contained in the captured image indicated by the first imaging information 117, the pointing element detection section 121 evaluates based on the first imaging information 117 whether the pointing element includes the right hand H1, the left hand H2, or none of the right hand H1 and the left hand H2.

In addition, when the pointing element is contained in the captured image indicated by the imaging information 116, the pointing element detection section 121 evaluates based on the imaging information 116 whether the pointing element is in contact with the wall surface W1. In the present embodiment, when the pointing element is contained in the captured image indicated by the second imaging information 118, the pointing element detection section 121 evaluates based on the second imaging information 118 whether the pointing element is in contact with the wall surface W1.

When the pointing element contained in the captured image indicated by the imaging information 116 is in contact with the wall surface W1, the pointing position detection section 122 identifies based on the imaging information 116 the location where the pointing element is in contact with the wall surface W1. In the present embodiment, when the pointing element contained in the captured image indicated by the second imaging information 118 is in contact with the wall surface W1, the pointing position detection section 122 identifies based on the second imaging information 118 the XY coordinates of the location where the pointing element is in contact with the wall surface W1. The "location where the pointing element is in contact with the wall surface W1" is an example of the "pointing position to which the pointing element points," and may specifically be, for example, "the location where the fingertip H10 of the right hand H1 is in contact with the wall surface W1".

To achieve the function of the detection unit 120, that is, the function relating to the detection of the pointing element, for example, template matching using a plurality of template images, machine learning, or any other known image processing technology may be used. Detailed technical description relating to the detection of the pointing element is omitted in the present specification.

The projection control section 124 controls the projection section 15 to project the projection light for displaying the projection image GP onto the display surface. When the pointing element detection section 121 determines that the right hand H1 is contained in the captured image indicated by the imaging information 116, the projection control section 124 causes the projection section 15 to project the projection light for displaying the projection image GP1 onto the display surface. When the pointing element detection section 121 determines that the left hand H2 is contained in the captured image indicated by the imaging information 116, the projection control section 124 causes the projection section 15 to project the projection light for displaying the projection image GP2 onto the display surface. When the pointing element detection section 121 determines that none of the right hand H1 and the left hand H2 is contained in the captured image indicated by the imaging information 116, the projection control section 124 causes the projection section 15 to project the projection light for displaying the projection image GP3 onto the display surface. In the present embodiment, when the pointing element contained in the captured image indicated by the first imaging information 117 includes the right hand H1, the projection control section 124 causes the projection section 15 to project the projection light for displaying the projection image GP1 onto the wall surface W1. That is, the projection control section 124 controls the projection section 15 to display the operation image GU1 indicated by the first operation image information 113 on the wall surface W1. When the pointing element contained in the captured image indicated by the first imaging information 117 contains the left hand H2, the projection control section 124 causes the projection section 15 to project the projection light for displaying the projection image GP2 onto the wall surface W1. That is, the projection control section 124 controls the projection section 15 to display the operation image GU2 indicated by the second operation image information 114 on the wall surface W1. When the pointing element contained in the captured image indicated by the first imaging information 117 contains none of the right hand H1 and the left hand H2, the projection control section 124 causes the projection section 15 to project the projection light for displaying the projection image GP3 onto the wall surface W1. That is, the projection control section 124 controls the projection section 15 to display the operation image GU3 indicated by the third operation image information 115 on the wall surface W1.

The processing section 125 executes a variety of processes based on the XY coordinates of the location where the pointing element is in contact with the wall surface W1 and the item image GC displayed at the location. In other word, when the pointing position to which the pointing element points falls within the region where one of the plurality of item images GC contained in the operation image GU is displayed, the processing section 125 executes a process corresponding to the one item image GC. When no item image GC is displayed at the location where the pointing element is in contact with the wall surface W1, the processing section 125 may, for example, stop displaying the operation image GU.

The imaging section 13 is, for example, a camera including an imaging device that converts focused light into an electric signal and an imaging lens. The imaging device is, for example, an image sensor, such as a CCD or a CMOS device. CCD is an abbreviation for a charge coupled device, and CMOS is an abbreviation for complementary metal oxide semiconductor. The imaging lens is provided so as to capture an image of the range containing the region, of the wall surface W1, on which the projection image GP is displayed, and the space in the vicinity of the region of the wall surface W1. The imaging section 13 acquires an captured image under the control of the imaging control section 123. The captured image is outputted as the imaging information 116 representing the captured image to the control unit 12.

In the present embodiment, the projector 1 preferably includes a plurality of cameras as the imaging section 13. The plurality of cameras provided in the projector 1 are preferably provided in different positions from one another. The imaging information 116 is preferably information representing the result of the imaging, from the plurality of different position, of the range containing the region, of the wall surface W1, on which the projection image GP is displayed, and the space in the vicinity of the region of the wall surface W1. Three-dimensional positions can thus be calculated with improved accuracy by using triangulation, whereby the pointing position to which the pointing element points can be more accurately detected.

The operation section 14 accepts input operation to be performed on the projector 1 from the user of the projector 1. The operation section 14 is, for example, a touch panel or operation buttons provided as part of the enclosure of the projector 1. When the operation section 14 includes a touch panel, the operation section 14 outputs data representing a detected touch position to the control unit 12. When the operation section 14 includes operation buttons, the operation section 14 outputs data that identifies a pressed button to the control unit 12. The content of the input operation to be performed on the projector 1 is thus transmitted to the control unit 12.

The projection section 15 projects the projection light for displaying the projection image GP on the display surface under the control of the projection control section 124. In the present embodiment, the projection section 15 projects the projection light for displaying the projection image GP onto the wall surface W1. The projection section 15 includes, for example, a light source, a light modulator, and a projection lens, none of which is shown. The light modulator can, for example, be a liquid crystal panel or a digital mirror device. The light source can, for example, be a halogen lamp, a xenon lamp, an ultrahigh-pressure mercury lamp, an LED, or a laser light source. LED is an abbreviation of a light emitting diode.

1.4. Action of Projector

Figure 12:
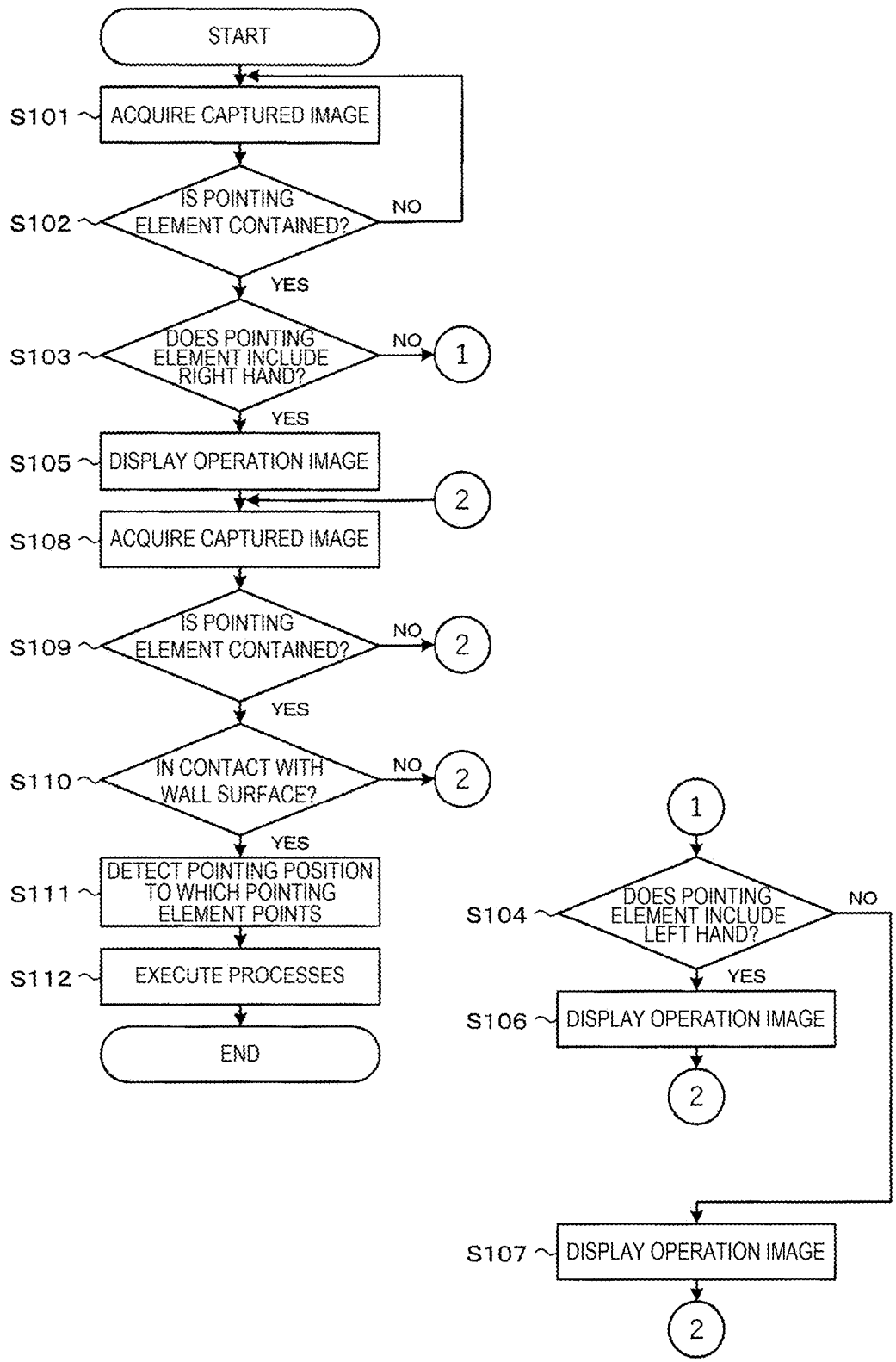
FIG. 12 is a flowchart for describing the action of the projector according to the first embodiment.

FIG. 12 is a flowchart for describing the action of the projector 1 according to the first embodiment. A series of actions shown in the flowchart starts, for example, when the projector 1 is powered on and the operation section 14 accepts input operation relating to the start of the action from the user of the projector 1. It is assumed in the present embodiment that the projector 1 projects the projection light for displaying the projection image GP0 onto the wall surface W1 when the projector 1 is powered on.

In step S101, the imaging control section 123 controls the imaging section 13 to capture an image of the range containing the region, of the wall surface W1, on which the projection image GP0 is displayed, and the space in the vicinity of the region of the wall surface W1. The imaging control section 123 then acquires from the imaging section 13 the first imaging information 117 representing the result of the imaging of the range containing the region, of the wall surface W1, on which the projection image GP0 is displayed, and the space in the vicinity of the region of the wall surface W1. The imaging control section 123 causes the storage 11 to store the acquired first imaging information 117.

In step S102, the pointing element detection section 121 evaluates based on the first imaging information 117 whether the pointing element is contained in the captured image indicated by the first imaging information 117. When the result of the evaluation in step S102 is affirmative, that is, when the result is YES in step S102, the pointing element detection section 121 proceeds to the process in step S103. When the result of the evaluation in step S102 is negative, that is, when the result is NO in step S102, the pointing element detection section 121 proceeds to the process in step S101.

Once the series of actions shown in the flowchart of FIG. 12 starts, the user moves the pointing element into the imaging range of the imaging section 13 to cause the projector 1 to capture an image of the pointing element. The projector 1 can proceed to the process in step S103 by capturing an image of the pointing element and detecting the pointing element based on the captured image. Until the user causes the projector 1 to detect the pointing element, the projector 1 repeatedly executes the processes in steps S101 and S102.

In step S103, the pointing element detection section 121 evaluates based on the first imaging information 117 whether the pointing element contained in the captured image indicated by the first imaging information 117 includes the right hand H1. When the result of the evaluation in step S103 is affirmative, that is, when the result is YES in step S103, the pointing element detection section 121 proceeds to the process in step S105. When the result of the evaluation in step S103 is negative, that is, when the result is NO in step S103, the pointing element detection section 121 proceeds to the process in step S104.

In step S104, the pointing element detection section 121 evaluates based on the first imaging information 117 whether the pointing element contained in the captured image indicated by the first imaging information 117 includes the left hand H2. When the result of the evaluation in step S104 is affirmative, that is, when the result is YES in step S104, the pointing element detection section 121 proceeds to the process in step S106. When the result of the evaluation in step S104 is negative, that is, when the result is NO in step S104, the pointing element detection section 121 proceeds to the process in step S107.

When the result of the evaluation in step S103 is affirmative, the captured image indicated by the first imaging information 117 is considered to contain the right hand H1. When the result of the evaluation in step S104 is affirmative, the captured image indicated by the first imaging information 117 is considered to contain the left hand H2. When the results of the evaluation in steps S103 and S104 are both negative, the captured image indicated by the first imaging information 117 is considered to contain none of the right hand H1 and the left hand H2.

In step S105, the projection control section 124 controls the projection section 15 to project the projection light for displaying the projection image GP1 onto the wall surface W1. That is, the projection control section 124 controls the projection section 15 to display the operation image GU1 indicated by the first operation image information 113 on the wall surface W1.

In step S106, the projection control section 124 controls the projection section 15 to project the projection light for displaying the projection image GP2 onto the wall surface W1. That is, the projection control section 124 controls the projection section 15 to display the operation image GU2 indicated by the second operation image information 114 on the wall surface W1.

In step S107, the projection control section 124 controls the projection section 15 to project the projection light for displaying the projection image GP3 onto the wall surface W1. That is, the projection control section 124 controls the projection section 15 to display the operation image GU3 indicated by the third operation image information 115 on the wall surface W1.

When the pointing element detection section 121 determines that the right hand H1 is contained in the captured image indicated by the first imaging information 117, the projection control section 124 causes the projection section 15 to display the operation image GU1. In other words, when the detected pointing element includes the right hand H1, the item images GC1 to GC9 are placed based on the aspect of the operation image GU1. When the pointing element detection section 121 determines that the left hand H2 is contained in the captured image indicated by the first imaging information 117, the projection control section 124 causes the projection section 15 to display the operation image GU2. In other words, when the detected pointing element includes the left hand H2, the item images GC1 to GC9 are placed based on the aspect of the operation image GU2. When the pointing element detection section 121 determines that none of the right hand H1 and the left hand H2 is contained in the captured image indicated by the first imaging information 117, the projection control section 124 causes the projection section 15 to display the operation image GU3. In other words, when the detected pointing element contains none of the right hand H1 and the left hand H2, the item images GC1 to GC9 are placed based on the aspect of the operation image GU3.

In step S108, the imaging control section 123 controls the imaging section 13 to capture an image of the range containing the region, of the wall surface W1, on which the projection image GP is displayed, and the space in the vicinity of the region of the wall surface W1. The imaging control section 123 then acquires from the imaging section 13 the second imaging information 118 representing the result of the imaging of the range containing the region, of the wall surface W1, on which the projection image GP is displayed, and the space in the vicinity of the region of the wall surface W1. The imaging control section 123 causes the storage 11 to store the acquired second imaging information 118.

In step S109, the pointing element detection section 121 evaluates based on the second imaging information 118 whether the pointing element is contained in the captured image indicated by the second imaging information 118. When the result of the evaluation in step S109 is affirmative, that is, when the result is YES in step S109, the pointing element detection section 121 proceeds to the process in step S110. When the result of the evaluation in step S109 is negative, that is, when the result is NO in step S109, the pointing element detection section 121 proceeds to the process in step S108.

In step S110, the pointing element detection section 121 evaluates based on the second imaging information 118 whether the pointing element contained in the captured image indicated by the second imaging information 118 is in contact with the wall surface W1. When the result of the evaluation in step S110 is affirmative, that is, when the result is YES in step S110, the pointing element detection section 121 proceeds to the process in step S111. When the result of the evaluation in step S110 is negative, that is, when the result is NO in step S110, the pointing element detection section 121 proceeds to the process in step S108.

After displaying the operation image GU in step S105, S106 or S107, the projector 1 detects the pointing element again. Thereafter, in step S110, the projector 1 evaluates based on the captured image whether the pointing element is in contact with the wall surface W1, more specifically, whether the pointing element is in contact with the projection image GP displayed on the wall surface W1. In other words, in step S110, the projector 1 evaluates whether the user has performed pointing operation on the projection image GP. Until the user performs pointing operation on the projected image GP, the projector 1 repeatedly executes the processes in steps S108 to S110.

In step S111, the pointing position detection section 122 identifies based on the second imaging information 118 the XY coordinates of the location where the pointing element contained in the captured image indicated by the second imaging information 118 is in contact with the wall surface W1.

In step S112, the processing section 125 executes a variety of processes based on the XY coordinates of the location where the pointing element contained in the captured image indicated by the second imaging information 118 is in contact with the wall surface W1, and the item image GC displayed at the location. In other word, when the pointing position to which the pointing element contained in the captured image indicated by the second imaging information 118 points falls within the region where one of the plurality of item images GC contained in the operation image GU is displayed, the processing section 125 executes a process corresponding to the one item image GC.

For example, when the operation image GU1 is displayed on the wall surface W1 and the pointing position to which the right hand H1 points falls within the region R31, the projector 1 executes the eraser tool call-up process corresponding to the item image GC2 displayed in the region R31. When the operation image GU1 is displayed on the wall surface W1 and the pointing position to which the right hand H1 points falls within the region R33, the projector 1 executes the redoing process corresponding to the item image GC4 displayed in the region R33. When the operation image GU1 is displayed on the wall surface W1 and the pointing position to which the right hand H1 points falls within the region R21, the projector 1 executes the drawing tool call-up process corresponding to the item image GC1 displayed in the region R21. When the operation image GU1 is displayed on the wall surface W1 and the pointing position to which the right hand H1 points falls within the region R23, the projector 1 executes the screen capture process corresponding to the item image GC7 displayed in the region R23.

For example, when the operation image GU2 is displayed on the wall surface W1 and the pointing position to which the left hand H2 points falls within the region R33, the projector 1 executes the eraser tool call-up process corresponding to the item image GC2 displayed in the region R33. When the operation image GU2 is displayed on the wall surface W1 and the pointing position to which the left hand H2 points falls within the region R31, the projector 1 executes the redoing process corresponding to the item image GC4 displayed in the region R31. When the operation image GU2 is displayed on the wall surface W1 and the pointing position to which the left hand H2 points falls within the region R23, the projector 1 executes the drawing tool call-up process corresponding to the item image GC1 displayed in the region R23. When the operation image GU2 is displayed on the wall surface W1 and the pointing position to which the left hand H2 points falls within the region R21, the projector 1 executes the screen capture process corresponding to the item image GC7 displayed in the region R21.

For example, when the operation image GU3 is displayed on the wall surface W1 and the pointing position to which the pointing element H9 points falls within the region R21, the projector 1 executes the eraser tool call-up process corresponding to the item image GC2 displayed in the region R21. When the operation image GU3 is displayed on the wall surface W1 and the pointing position to which the pointing element H9 points falls within the region R23, the projector 1 executes the redoing process corresponding to the item image GC4 displayed in the region R23. When the operation image GU3 is displayed on the wall surface W1 and the pointing position to which the pointing element H9 points falls within the region R31, the projector 1 executes the drawing tool call-up process corresponding to the item image GC1 displayed in the region R31. When the operation image GU3 is displayed on the wall surface W1 and the pointing position to which the pointing element H9 points falls within the region R11, the projector 1 executes the screen capture process corresponding to the item image GC7 displayed in the region R11.

When no item image GC is displayed at the location where the pointing element contained in the captured image indicated by the second imaging information 118 is in contact with the wall surface W1, the processing section 125, for example, executes the process of terminating the display of the operation image GU in step S112.

After the action in step S112 is performed, the control unit 12 terminates the series of actions shown in the flowchart of FIG. 12.

As described above, according to the first embodiment, the projector 1 can change the operation image GU to be displayed by detecting the pointing element used by the user to perform pointing operation, and further identifying the type of pointing element. That is, the projector 1 can display an optimum operation image GU in accordance with the type of the pointing element.

According to the first embodiment, the placement of the plurality of item images GC contained in the operation image GU is changed in accordance with the identified type of the pointing element. That is, the projector 1 can display item images GC relating to frequently executed processes in a placement that allows the user to readily operate the item images GC.

According to the first embodiment, when the projector 1 determines that the pointing element includes none of the right hand H1 and the left hand H2, the projector 1 can display the operation image GU in an aspect different from the aspect in which the pointing element includes the left hand H1 and the aspect in which the pointing element includes the left hand H2. That is, the projector 1 can display the operation image GU in a versatile aspect, for example, even when the type of the pointing element cannot be accurately identified.

As described above, the display method according to the first embodiment includes detecting the pointing element and displaying the operation image GU containing the item images GC1 to GC9. When the pointing element includes the right hand H1, the item images GC1 to GC9 are placed in the operation image GU based on the aspect of the operation image GU1, and when the pointing element includes the left hand H2, the item images GC1 to GC9 are placed in the operation image GU based on the aspect of the operation image GU2.

The projector 1 according to the first embodiment includes one or more CPUs, and the one or more CPUs each detect the pointing element and display the operation image GU containing the item images GC1 to GC9. When the pointing element includes the right hand H1, the item images GC1 to GC9 are placed in the operation image GU based on the aspect of the operation image GU1, and when the pointing element includes the left hand H2, the item images GC1 to GC9 are placed in the operation image GU based on the aspect of the operation image GU2.

That is, the projector 1 according to the present embodiment can detect the pointing element used by the user to perform pointing operation, and change the placement of the plurality of item images GC depending on whether the pointing element includes the right hand H1 or the left hand H2. The projector 1 can thus display an operation image GU with excellent operability in accordance with the type of the pointing element.

In the first embodiment, the projector 1 is an example of a "display apparatus", the item images GC1 to GC9 are an example of "a plurality of item images", the operation image GU is an example of an "operation image", the right hand H1 is an example of a "right hand", the left hand H2 is an example of a "left hand", the CPU is an example of a "processor", the detection unit 120 is an example of a "detection section", and the projection control section 124 is an example of a "display control section". The right hand H1 and the left hand H2 are an example of a "pointing element", the aspect of the operation image GU1 is an example of a "first aspect", and the aspect of the operation image GU2 is an example of the "second aspect".

In the display method according to the first embodiment, the operation image GU has the regions R31 and R33. The item images GC1 to GC9 include the item image GC2 relating to the eraser tool call-up process. The item image GC2 is placed in the region R31 of the operation image GU1, and placed in the region R33 of the operation image GU2.

The projector 1 according to the present embodiment can therefore display an item image GC relating to a predetermined process in different kinds of placement in accordance with the type of the pointing element.

In the first embodiment, the region R31 is an example of a "first region", the region R33 is an example of a "second region", the eraser tool call-up process is an example of a "first process", the operation image GU1 is an example of the "operation image of the first aspect", and the operation image GU2 is an example of the "operation image of the second aspect". The item image GC2 is an example of the "item image relating to the first process".

In the display method according to the first embodiment, the item images GC1 to GC9 include the item image GC4 relating to the redoing process. The item image GC4 is placed in the region R33 of the operation image GU1, and placed in the region R31 of the operation image GU2.

The projector 1 according to the present embodiment can therefore display two types of item images GC relating to different processes in such a way that the positions of the two item images GC are swapped in accordance with the type of the pointing element.

In the first embodiment, the redoing process is an example of a "second process". The item image GC4 is an example of the "item image relating to the second process".

The display method according to the first embodiment further includes detecting the pointing position to which the pointing element points, executing the eraser tool call-up process when the pointing position falls within the region where the item image GC2 is displayed, and executing the redoing process when the pointing position falls within the region where the item image GC4 is displayed, and the region R31 is shifted leftward from the region R33 when viewed from the user.

That is, the projector 1 according to the present embodiment can execute a process corresponding to an item image GC displayed at the pointing position in accordance with the user's pointing operation. The projector 1 can display two types of item images GC relating to different processes in accordance with the type of the pointing element in such a way that the positions of the two item images GC are swapped, one of the item images GC placed on the right side and the other placed on the left side. The item image GC2 relating to the eraser tool call-up process is thus unlikely to be hidden behind the pointing element both in the case where the pointing element includes the right hand H1 and the case where the pointing element includes the left hand H2. Pointing operation is therefore performed on the item image GC2 with improved operability.

In the first embodiment, the "pointing position to which the pointing element points" may, for example, be "the location where the fingertip H10 of the right hand H1 is in contact with the wall surface W1".

In the display method according to the first embodiment, the eraser tool call-up process is more frequently executed than the redoing process.

That is, when the pointing element includes the right hand H1, the projector 1 according to the present embodiment can display the item image GC2 relating to a process that is frequently executed in a position shifted leftward from the item image GC4 relating to a process that is not frequently executed. When the pointing element includes the left hand H2, the projector 1 can display the item image GC2 relating to a process that is frequently executed in a position shifted rightward from the item image GC4 relating to a process that is not frequently executed. The projector 1 can therefore display an item image GC relating to a frequently executed process at a highly visual location in accordance with the type of the pointing element.

In the display method according to the first embodiment, when the pointing element includes none of the right hand H1 and the left hand H2, the item images GC1 to GC9 are placed in the operation image GU based on the aspect of the operation image GU3.

That is, when the projector 1 according to the present embodiment determines that the pointing element includes none of the right hand H1 and the left hand H2, the projector 1 can display the operation image GU in an aspect different from the aspect in which the pointing element includes the right hand H1 and the aspect in which the pointing element includes the left hand H2. The projector 1 can thus display the operation image GU in a versatile aspect, for example, even when the type of the pointing element cannot be accurately identified.

In the first embodiment, the aspect of the operation image GU3 is an example of a "third process".

In the display method according to the first embodiment, the operation image GU has the regions R31 and R21. The region R31 is located upward from the region R21 when viewed from the user. The item images GC1 to GC9 include the item image GC2 relating to the eraser tool call-up processing and the item image GC1 relating to the drawing tool call-up process. The display method further includes detecting the pointing position to which the pointing element points, executing the eraser tool call-up process when the pointing position falls within the region where the item image GC2 is displayed, and executing the drawing tool call-up process when the pointing position falls within the region where the item image GC1 is displayed. In the operation image GU1, the item image GC2 is placed in the region R31, the item image GC1 is placed in the region R21. In the operation image GU3, the item image GC2 is placed in the region R21, and the item image GC1 is placed in the region R31.

The projector 1 according to the present embodiment can thus execute a process corresponding to an item image GC displayed at the pointing position in accordance with the user's pointing operation. The projector 1 can display two types of item images GC relating to different processes in accordance with the type of the pointing element in such a way that the positions of the two item images GC are swapped, one of the item images GC placed on the upper side and the other placed on the lower side.

In the first embodiment, the region R21 is an example of a "third region", the drawing tool call-up process is an example of a "third process", and the operation image GU3 is an example of the "operation image of a third aspect". The item image GC1 is an example of the "item image relating to the third process".

In the display method according to the first embodiment, the drawing tool call-up process is more frequently executed than the eraser tool call-up process.

That is, when the pointing element includes none of the right hand H1 and the left hand H2, the projector 1 according to the present embodiment can display the item image GC1 relating to a process that is frequently executed in a position shifted upward from the item image GC2 relating to a process that is not frequently executed. The projector 1 can therefore display an item image GC relating to a frequently executed process at a highly visual location even when the type of the pointing element cannot be accurately identified.

2. Second Embodiment

A second embodiment of the present disclosure will be described below. In the forms presented below by way of example, an element having the same effect and function as those in the first embodiment has the same reference character used in the description of the first embodiment, and no detailed description of the same element will be made as appropriate.

A projector 1A according to the second embodiment identifies the frequencies at which the processes corresponding to the item images GC1 to GC9 are executed, and changes the placement of the item images GC1 to GC9 based on the identified frequencies. In the following sections, the projector 1A according to the present embodiment will be described with reference for convenience to a case where the frequency at which the eraser tool call-up process corresponding to the item image GC2 is executed, and the frequency at which the redoing process corresponding to the item image GC4 is executed are identified, and the placement of the item images GC2 and GC4 is changed based on the two identified frequencies.

The operation image GU displayed when the user performs input operation on the projector 1A according to the second embodiment will be described below with reference to FIGS. 13 and 14.

Figure 13:
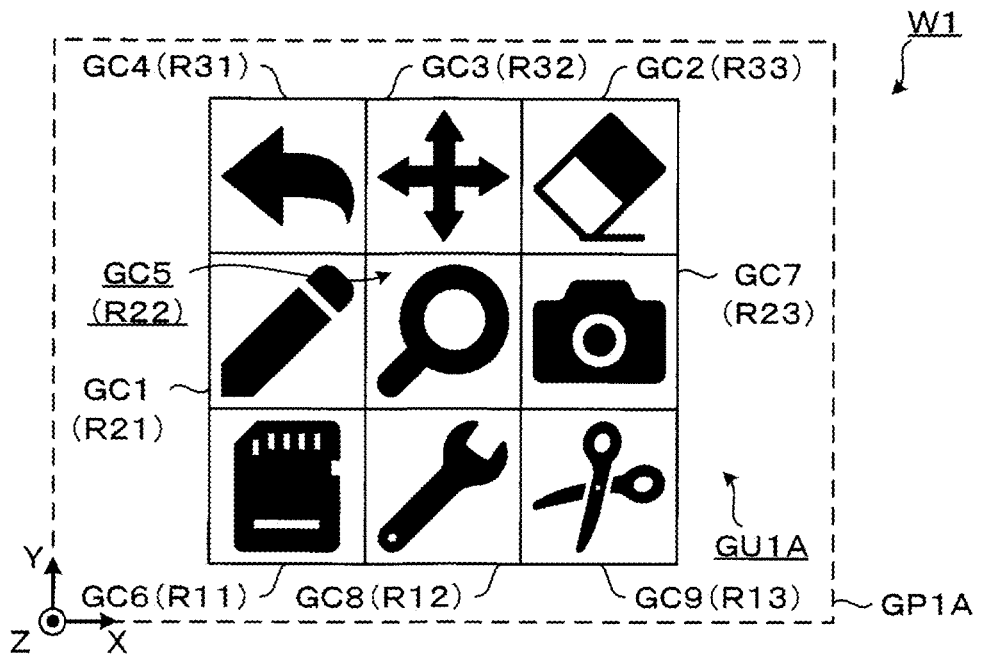
FIG. 13 is a diagrammatic view for describing an operation image.

FIG. 13 is a diagrammatic view for describing an operation image GU1A. The operation image GU1A is displayed on the wall surface W1 when the redoing process is executed more frequently than the eraser tool call-up process, and when the detected pointing element includes the right hand H1. The operation image GU1A is contained in a projection image GP1A. The operation image GU1A is a GUI containing the item images GC1 to GC9, as the operation images GU1, GU2, and GU3 are. The operation image GU1A has the same configuration as that of the operation image GU1, except that the item image GC4 is placed in the region R31 in place of the item image GC2, and that the item image GC2 is placed in the region R33 in place of the item image GC4.

Figure 14:
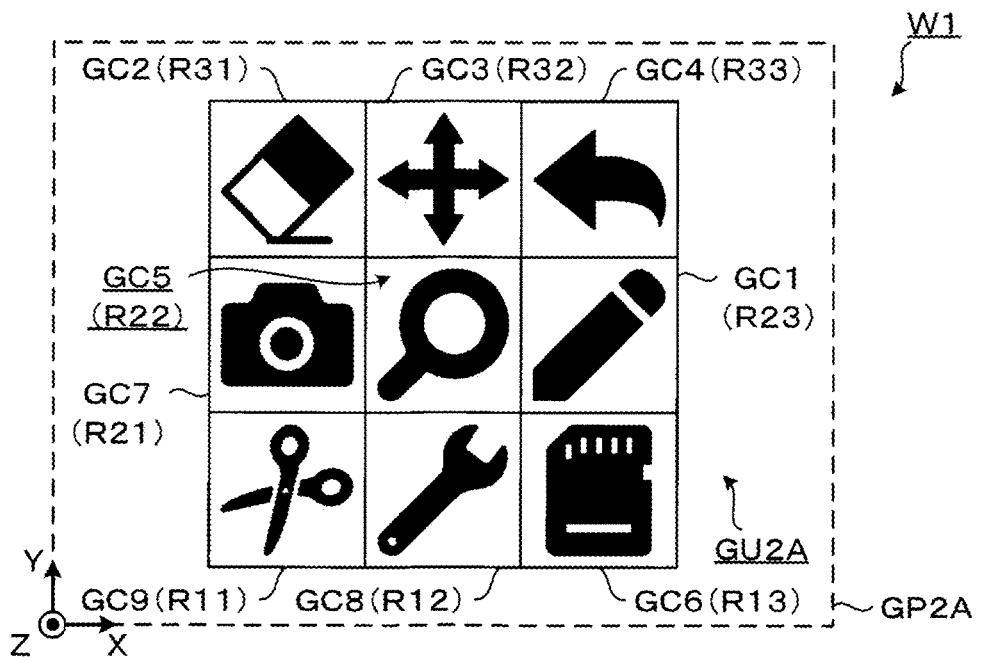
FIG. 14 is a diagrammatic view for describing another operation image.

FIG. 14 is a diagrammatic view for describing an operation image GU2A. The operation image GU2A is displayed on the wall surface W1 when the redoing process is executed more frequently than the eraser tool call-up process, and when the detected pointing element includes the left hand H2. The operation image GU2A is contained in a projection image GP2A. The operation image GU2A is a GUI containing the item images GC1 to GC9, as the operation images GU1, GU1A, GU2, and GU3 are. The operation image GU2A has the same configuration as that of the operation image GU2, except that the item image GC2 is placed in the region R31 in place of the item image GC4, and that the item image GC4 is placed in the region R33 in place of the item image GC2.

The projector 1A displays the operation image GU1 on the wall surface W1 when the eraser tool call-up process is executed more frequently than the redoing process, and when the detected pointing element includes the right hand H1. The projector 1A displays the operation image GU2 on the wall surface W1 when the eraser tool call-up process is executed more frequently than the redoing process, and when the detected pointing element includes the left hand H2.

The configuration and function of the projector 1A according to the second embodiment will be described below with reference to FIGS. 15 to 16.

Figure 15:
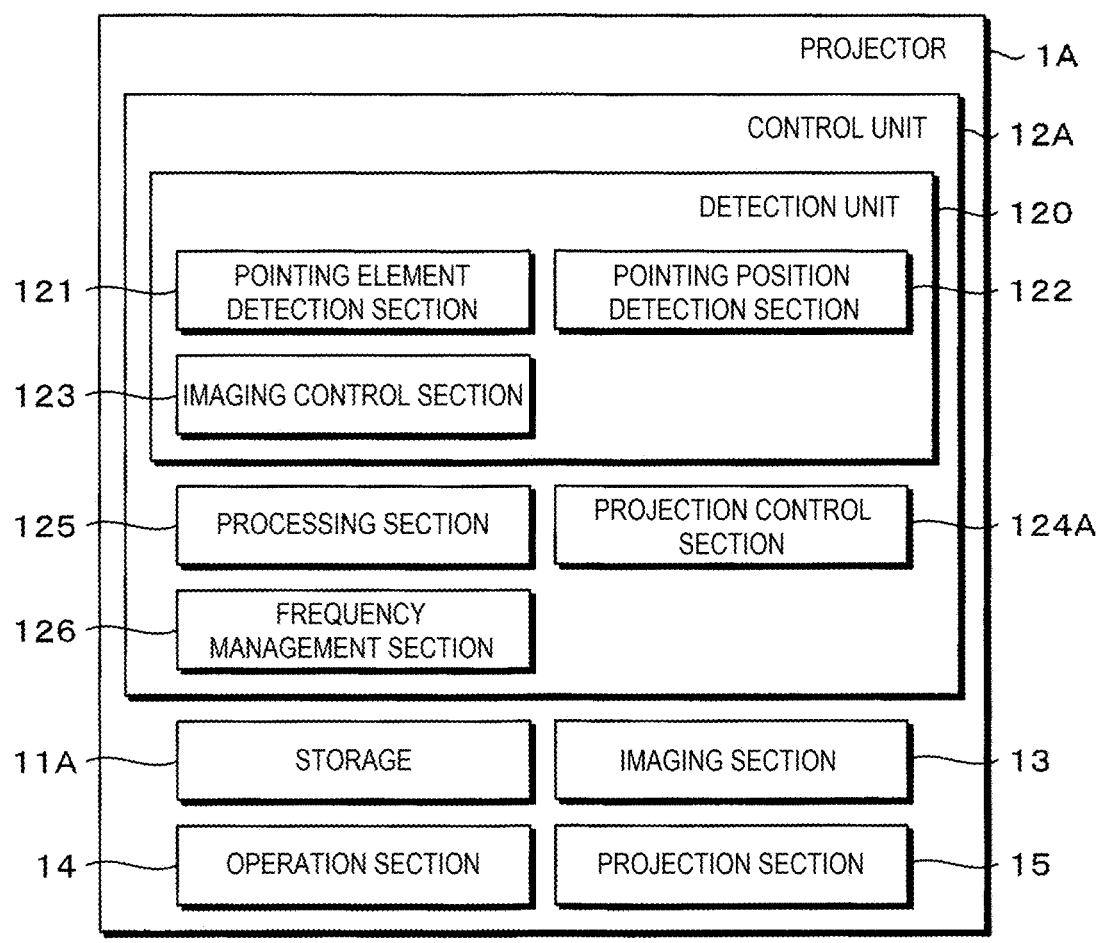
FIG. 15 is a block diagram showing the configuration of the projector according to a second embodiment.
Figure 16:
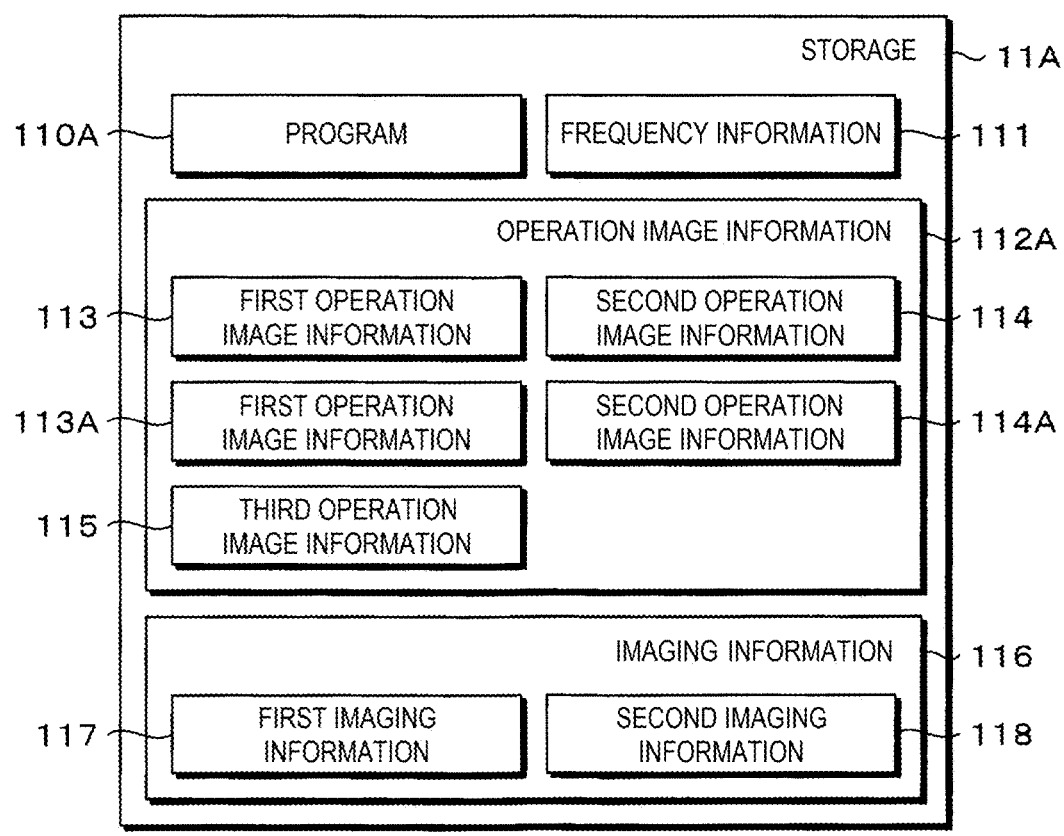
FIG. 16 is a block diagram showing the configuration of the storage according to the second embodiment.

FIG. 15 is a block diagram showing the configuration of the projector 1A according to the second embodiment. FIG. 16 is a block diagram showing the configuration of a storage 11A according to the second embodiment. The projector 1A has the same configuration as that of the projector 1 according to the first embodiment, except that the projector 1A includes the storage 11A in place of the storage 11 and a control unit 12A in place of the control unit 12. The storage 11A differs from the storage 11 according to the first embodiment in that the storage 11A stores a program 110A in place of the program 110, stores operation image information 112A in place of the operating image information 112, and stores frequency information 111 in addition to the imaging information 116 and other pieces of information. The operation image information 112A differs from the operation image information 112 in that the operation image information 112A contains first operation image information 113A and second operation image information 114A in addition to the first operation image information 113, the second operation image information 114, the third operation image information 115, and other pieces of information. The first operation image information 113A is information representing the operation image GU1A. The second operation image information 114A is information representing the operation image GU2A. The control unit 12A has the same configuration as that of the control unit 12 according to the first embodiment, except that the control unit 12A has the function as a projection control section 124A in place of the projection control section 124, and the function as a frequency management section 126 in addition to the detection unit 120, the processing section 125, and other sections. The control unit 12A functions as the detection unit 120, the projection control section 124A, the processing section 125, and the frequency management section 126 shown in FIG. 15 when the CPU or any other component provided in the control unit 12A executes the program 110A and operates in accordance with the program 110A.

The frequency management section 126 manages the frequencies at which the processes corresponding to the plurality of item images GC contained in the operation image GU are executed. Specifically, the frequency management section 126 manages the frequency information 111 representing the frequencies at which the processes corresponding to the plurality of item images GC contained in the operation image GU are executed. More specifically, the frequency management section 126 updates the frequency information 111 whenever any of the processes corresponding to the plurality of item images GC contained in the operation image GU is executed. For example, when the process corresponding to one of the plurality of item images GC contained in the operation image GU is executed, the frequency management section 126 causes the frequency information 111 to reflect the fact that the process corresponding to the one item image GC has been executed.

The frequency management section 126 refers to the frequency information 111 and identifies the frequencies at which the processes corresponding to the plurality of item images GC contained in the operation image GU are executed. In the present embodiment, the frequency management section 126 refers to the frequency information 111 and identifies the frequency at which the eraser tool call-up process is executed and the frequency at which the redoing process is executed. The projector 1A can thus determine which is more frequently executed, the eraser tool call-up process or the redoing process.

The projection control section 124A controls the projection section 15 to project the projection light for displaying the projection image GP onto the wall surface W1.

In the present embodiment, when the eraser tool call-up process is executed more frequently than the redoing process, and when the pointing element contained in the captured image indicated by the first imaging information 117 includes the right hand H1, the projection control section 124A projects the projection light for displaying the projection image GP1 onto the wall surface W1. That is, the projection control section 124A controls the projection section 15 to display the operation image GU1 indicated by the first operation image information 113 on the wall surface W1.

When the eraser tool call-up process is executed more frequently than the redoing process, and when the pointing element contained in the captured image indicated by the first imaging information 117 includes the left hand H2, the projection control section 124A projects the projection light for displaying the projection image GP2 onto the wall surface W1. That is, the projection control section 124A controls the projection section 15 to display the operation image GU2 indicated by the second operation image information 114 on the wall surface W1.

When the redoing process is executed more frequently than the eraser tool call-up process, and when the pointing element contained in the captured image indicated by the first imaging information 117 includes the right hand H1, the projection control section 124A projects the projection light for displaying the projection image GP1A onto the wall surface W1. That is, the projection control section 124A controls the projection section 15 to display the operation image GU1A indicated by the first operation image information 113A on the wall surface W1.

When the redoing process is executed more frequently than the eraser tool call-up process, and when the pointing element contained in the captured image indicated by the first imaging information 117 includes the left hand H2, the projection control section 124A projects the projection light for displaying the projection image GP2A onto the wall surface W1. That is, the projection control section 124A controls the projection section 15 to display the operation image GU2A indicated by the second operation image information 114A on the wall surface W1.

When the pointing element contained in the captured image indicated by the first imaging information 117 contains none of the right hand H1 and the left hand H2, the projection control section 124A projects the projection light for displaying the projection image GP3 onto the wall surface W1. That is, the projection control section 124A controls the projection section 15 to display the operation image GU3 indicated by the third operation image information 115 on the wall surface W1.

Figure 17:
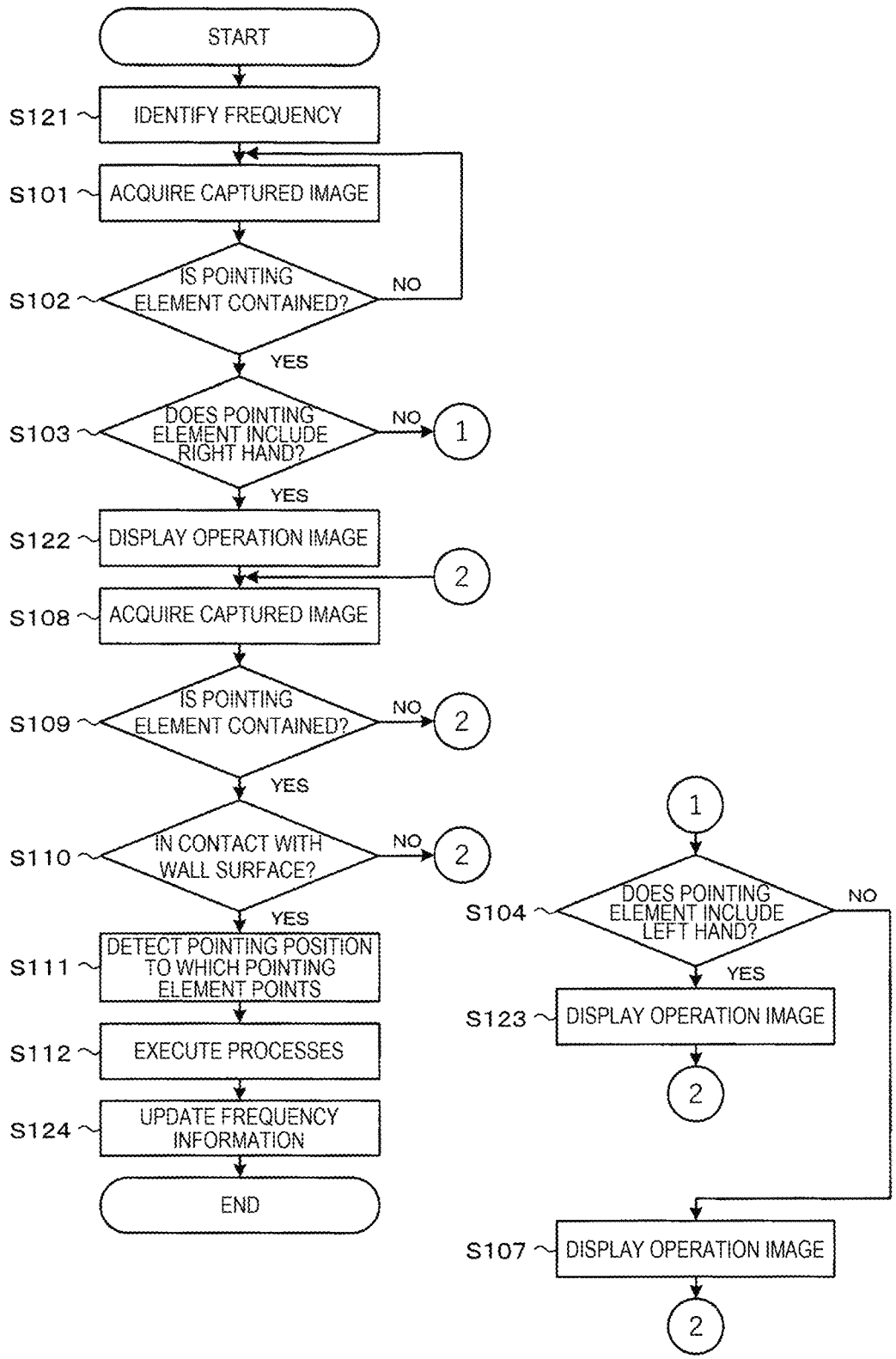
FIG. 17 is a flowchart for describing the action of the projector according to the second embodiment.

FIG. 17 is a flowchart for describing the action of the projector 1A according to the second embodiment. The flowchart shown in FIG. 17 is the same as the flowchart shown in FIG. 12, except that the control unit 12A executes the process in step S122 in place of step S105, executes the process in step S123 in place of step S106, and executes the processes in steps S121 and S124 in addition to the processes in steps S101 to S103 and S107 to S112.

In step S121, the frequency management section 126 refers to the frequency information 111 and identifies the frequency at which the eraser tool call-up process is executed and the frequency at which the redoing process is executed. That is, the frequency management section 126 determines which is more frequently executed, the eraser tool call-up process or the redoing process.

When the eraser tool call-up process is executed more frequently than the redoing process, the projection control section 124A controls the projection section 15 to project the projection light for displaying the projection image GP1 onto the wall surface W1 in step S122. That is, the projection control section 124A controls the projection section 15 to display the operation image GU1 indicated by the first operation image information 113 on the wall surface W1.

When the redoing process is executed more frequently than the eraser tool call-up process, the projection control section 124A controls the projection section 15 to project the projection light for displaying the projection image GP1A onto the wall surface W1 in step S122. That is, the projection control section 124A controls the projection section 15 to display the operation image GU1A indicated by the first operation image information 113A on the wall surface W1.

When the eraser tool call-up process is executed more frequently than the redoing process, the projection control section 124A controls the projection section 15 to project the projection light for displaying the projection image GP2 onto the wall surface W1 in step S123. That is, the projection control section 124A controls the projection section 15 to display the operation image GU2 indicated by the second operation image information 114 on the wall surface W1.

When the redoing process is executed more frequently than the eraser tool call-up process, the projection control section 124A controls the projection section 15 to project the projection light for displaying the projection image GP2A onto the wall surface W1 in step S123. That is, the projection control section 124A controls the projection section 15 to display the operation image GU2A indicated by the second operation image information 114A on the wall surface W1.

In step S124, the frequency management section 126 updates the frequency information 111 based on the processes executed in step S112. In other words, the frequency management section 126 causes the frequency information 111 to reflect the fact that the process in step S112 has been executed.

The above description has been made by way of example with reference to the case where the placement of the item images GC2 and GC4 is changed based on the frequency at which the eraser tool call-up process is executed and the frequency at which the redoing process is executed, but the present disclosure is not limited to the aspect described above. That is, in place of the frequencies at which the eraser tool call-up process and the redoing process are executed, the frequencies at which the processes corresponding to the plurality of item images GC contained in the operation image GU are executed can be identified, and the placement of the item images GC can be changed based on the frequencies. For example, the frequency at which the drawing tool call-up process corresponding to the item image GC1 is executed and the frequency at which the screen capture process corresponding to the item image GC7 is executed may be measured, and the placement of the item images GC1 and GC7 may be changed based on the two identified frequencies.

As described above, according to the second embodiment, the projector 1A can identify the frequencies at which the processes corresponding to the plurality of item images GC contained in the operation image GU are executed, and change the placement of the item images GC based on the frequencies. That is, the projector 1A can place item images GC relating to frequently executed processes in positions where the item images GC are readily operated.

As described above, in the display method according to the second embodiment, the operation image GU has the regions R31 and R33. The region R31 is shifted leftward from the region R33 when viewed from the user. The item images GC1 to GC9 include the item image GC2 relating to the eraser tool call-up process and the item image GC4 relating to the redoing process. The display method further includes detecting the pointing position to which the pointing element points, executing the eraser tool call-up process when the pointing position falls within the region where the item image GC2 is displayed, executing the redoing process when the pointing position falls within the region where the item image GC4 is displayed, and identifying the frequency at which the eraser tool call-up process is executed and the frequency at which the redoing process is executed. When the frequency at which the eraser tool call-up process is executed is higher than the frequency at which the redoing process is executed, the item image GC2 is placed in the region R31, and the item image GC4 is placed in the region R33 in the operation image GU1, and the item image GC2 is placed in the region R33, and the item image GC4 is placed in the region R31 in the operation image GU2. When the frequency at which the redoing process is executed is higher than the frequency at which the eraser tool call-up process is executed, the item image GC2 is placed in the region R33, and the item image GC4 is placed in the region R31 in the operation image GU1A, and the item image GC2 is placed in the region R31, and the item image GC4 is placed in the region R33 in the operation image GU2A.

That is, the projector 1A according to the present embodiment can identify the frequencies at which the processes corresponding to the plurality of item images GC contained in the operation image GU are executed, and change the placement of the item images GC based on the frequencies. The projector 1A can thus display an item image GC relating to a frequently executed process in accordance with the frequency at which the process is executed and the type of pointing element in a position where the item image GC is readily operated as compared with a case where the frequency at which the process is executed is not identified.

In the second embodiment, the operation image GU is an example of the "operation image", the region R31 is an example of the "first region", the region R33 is an example of the "second region", the item images GC1 to GC9 are an example of the "plurality of item images", the eraser tool call-up process is an example of the "first process", and the redoing process is an example of the "second process". The item image GC2 is an example of the "item image relating to the first process", the item image GC4 is an example of the "item image relating to the second process", the operation image GU1 and the operation image GU1A are an example of the "operation image in the first aspect", and the operation image GU2 and the operation image GU2A are an example of the "operation image in the second aspect".

3. Variations

The embodiments described above can be changed in a variety of manners. Specific aspects of the changes will be presented below by way of example. Two or more aspects arbitrarily selected from those presented below by way of example may be combined with each other as appropriate to the extent that the selected aspects do not contradict each other. In the variations presented below by way of example, an element providing the same effect and having the same function as those in the embodiments described above has the same reference character used in the above description, and no detailed description of the same element will be made as appropriate.

3.1. Variation 1

The aforementioned embodiments have been described with reference to the case where the operation image GU displayed when the detected pointing element includes the left hand and the operation image GU displayed when the detected pointing element includes the right hand are so displayed that the item images GC are only placed differently, but not necessarily in the present disclosure. For example, the pictorial patterns of the item images GC contained in the operation image GU displayed when the detected pointing element includes the left hand may differ from the pictorial patterns of the item images GC contained in the operation image GU displayed when the detected pointing element includes the right hand.

Figure 18:
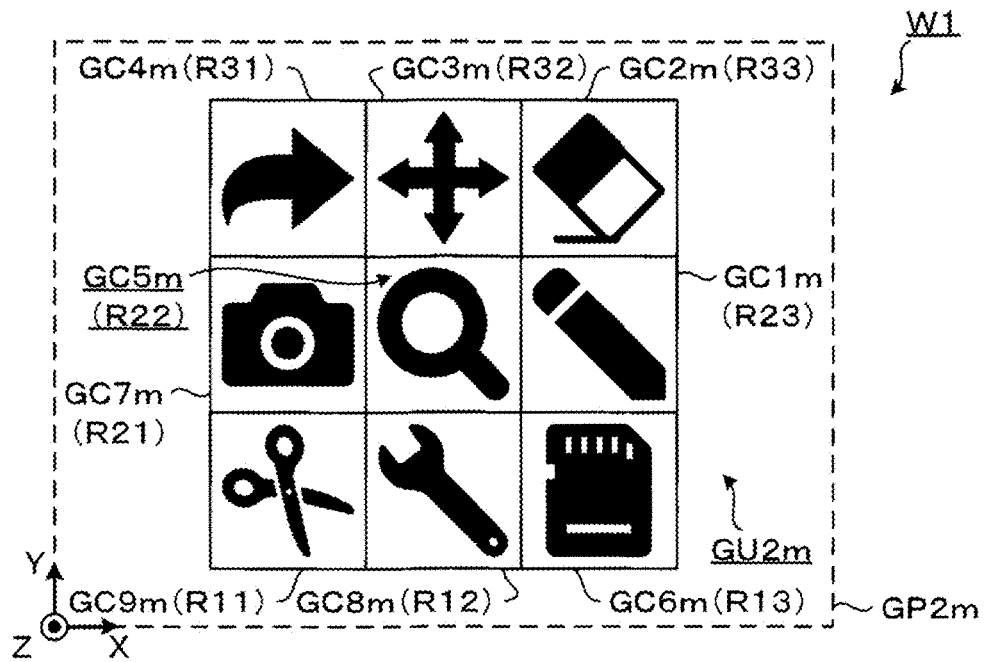
FIG. 18 is a diagrammatic view for describing an operation image.

FIG. 18 is a diagrammatic view for describing an operation image GU2$m$. The operation image GU2$m$ is a horizontally inverted version of the operation image GU1. The operation image GU2$m$ is contained in a projection image GP2$m$. The operation image GU2$m$ is displayed on the wall surface W1 when the detected pointing element includes the left hand H2. The operation image GU2$m$ is a GUI containing item images GC1$m$ to GC9$m$. The item images GC1$m$ to GC9$m$ are horizontally inverted versions of the item images GC1 to GC9.

The item image GC1$m$ is an item image relating to a drawing tool call-up process, as the item image GC1 is. In the operation image GU2$m$, the item image GC1$m$ is placed in the region R23.

The item image GC2$m$ is an item image relating to the eraser tool call-up process, as the item image GC2 is. In the operation image GU2$m$, the item image GC2$m$ is placed in the region R33.

The item image GC3$m$ is an item image relating to the movement tool call-up process, as the item image GC3 is. In the operation image GU2$m$, the item image GC3$m$ is placed in the region R32.

The item image GC4$m$ is an item image relating to the redoing process, as the item image GC4 is. In the operation image GU2$m$, the item image GC4$m$ is placed in the region R31.

The item image GC5$m$ is an item image relating to the screen enlargement tool call-up process, as the item image GC5 is. In the operation image GU2$m$, the item image GC5$m$ is placed in the region R22.

The item image GC6$m$ is an item image relating to the saving process, as the item image GC6 is. In the operation image GU2$m$, the item image GC6$m$ is placed in the region R13.

The item image GC7$m$ is an item image relating to the screen capture process, as the item image GC7 is. In the operation image GU2$m$, the item image GC7$m$ is placed in the region R21.

The item image GC8$m$ is an item image relating to the setting screen call-up process, as the item image GC8 is. In the operation image GU2$m$, the item image GC8$m$ is placed in the region R12.

The item image GC9$m$ is an item image relating to the cutting tool call-up process, as the item image GC9 is. In the operation image GU2$m$, the item image GC9$m$ is placed in the region R11.

That is, in the operation image GU2*m*, the item image GC2*m* placed in the region R33 is placed rightward from the item image GC4*m*, which is placed in the region R31, when viewed from the user.

The item image GC1*m* placed in the region R23 is placed rightward from the item image GC7*m*, which is placed in the region R21, when viewed from the user.

As described above, according to Variation 1, the operation image GU2*m* is displayed in an aspect in which the operation image GU1 is horizontally inverted. That is, the operation image GU2*m* can be displayed simply by horizontally inverting the operation image GU1 without creating the operation image GU2 in advance.

The pictorial patterns of the item images GC contained in the operation image GU are not necessarily horizontally inverted, but may instead be vertically inverted. The pictorial patterns of the item images GC contained in the operation image GU may still instead be displayed, for example, in an aspect in which the item images GC are rotated clockwise by 90 degrees. Still further instead, the operation image GU displayed when the detected pointing element includes the left hand and the operation image GU displayed when the detected pointing element includes the right hand may be displayed in colors different from each other.

As described above, in the display method according to Variation 1, the operation image GU2*m* is a horizontally inverted version of the operation image GU1.

That is, the operation image GU2*m* according to the present variation is displayed in an aspect in which the operation image GU1 is horizontally inverted. Therefore, even in a case where the projector does not store the second operation image information 114, when the detected pointing element includes the left hand H2, the projector can display the operation image GU2*m* with excellent operability on the wall surface W1 by horizontally inverting the operation image GU1.

In Variation 1, the operation image GU2*m* is an example of the "operation image in the second aspect", and the operation image GU1 is an example of the "operation image in the first aspect".

3.2. Variation 2

The aforementioned embodiments and variation have been described by way of example with reference to the case where the operation image is a rectangular image, but not necessarily in the present disclosure. For example, the operation image may be an image having a circular contour.

Figure 19:
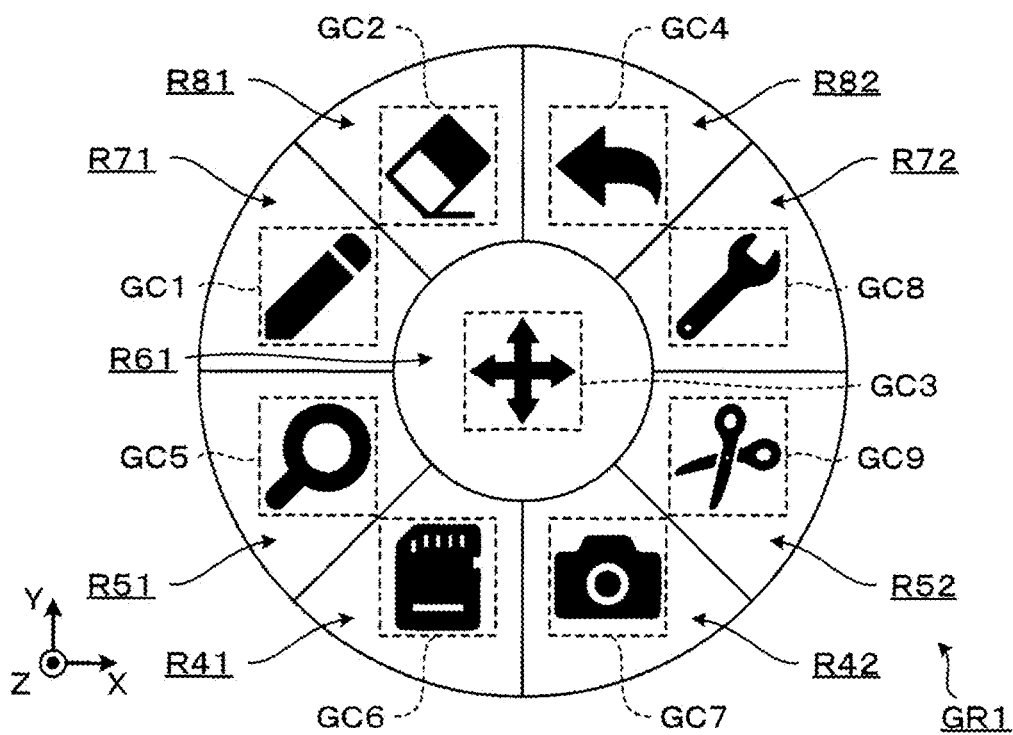
FIG. 19 is a diagrammatic view for describing another operation image.
Figure 20:
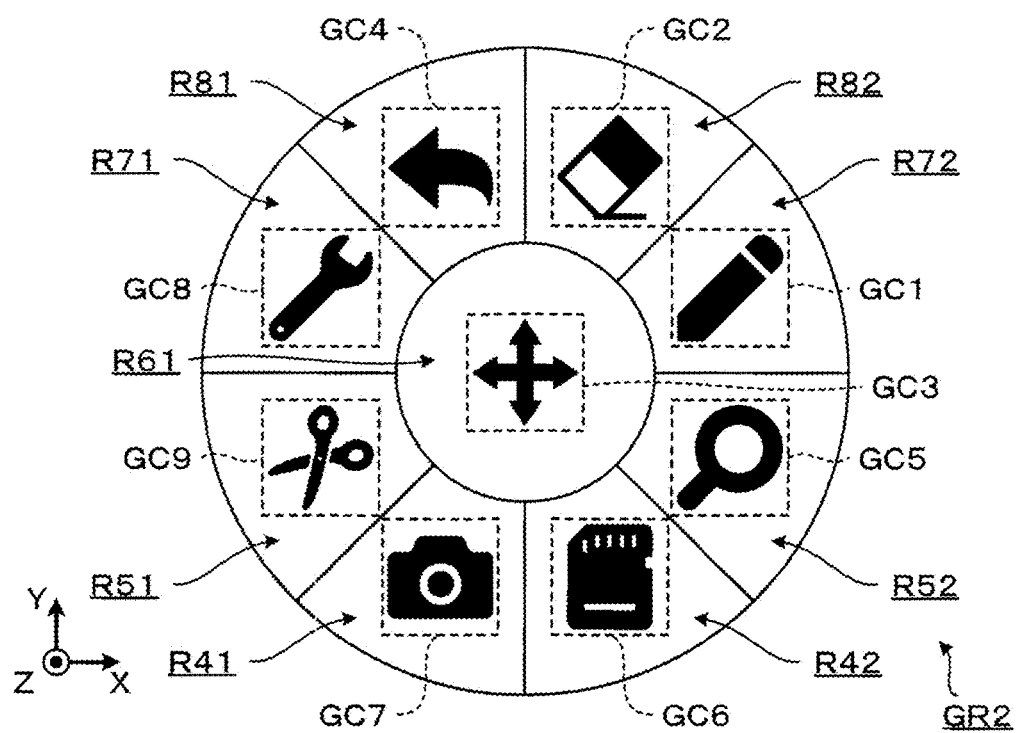
FIG. 20 is a diagrammatic view for describing still another operation image.

An operation image GR according to Variation 2 will be described below with reference to FIGS. 19 and 20. FIG. 19 is a diagrammatic view for describing an operation image GR1. The operation image GR1 is displayed when the detected pointing element includes the right hand H1. FIG. 20 is a diagrammatic view for describing an operation image GR2. The operation image GR2 is displayed when the detected pointing element includes the left hand H2. In the present variation, the operation image GR is a generic name for the operation images GR1 and GR2.

The operation image GR has regions R41, R42, R51, R52, R61, R71, R72, R81, and R82. The operation image GR is a GUI containing the item images GC1 to GC9.

In the present variation, the regions R51 and R52 are considered to be located upward from the regions R41 and R42 when viewed from the user. The region R61 is considered to be located upward from the regions R51 and R52 when viewed from the user. The regions R71 and R72 are considered to be located upward from the region R61 when viewed from the user. The regions R81 and R82 are considered to be located upward from the regions R71 and R72 when viewed from the user.

In the present variation, the regions R42 and R82 are considered to be located leftward from the regions R52 and R72 when viewed from the user. The region R61 is considered to be located leftward from the regions R42 and R82 when viewed from the user. The regions R41 and R81 are considered to be located leftward from the region R61 when viewed from the user. The regions R51 and R71 are considered to be located leftward from the regions R41 and R81 when viewed from the user.

In the operation image GR1, the item image GC1 is placed in the region R71.

In the operation image GR1, the item image GC2 is placed in the region R81.

In the operation image GR1, the item image GC3 is placed in the region R61.

In the operation image GR1, the item image GC4 is placed in the region R82.

In the operation image GR1, the item image GC5 is placed in the region R51.

In the operation image GR1, the item image GC6 is placed in the region R41.

In the operation image GR1, the item image GC7 is placed in the region R42.

In the operation image GR1, the item image GC8 is placed in the region R72.

In the operation image GR1, the item image GC9 is placed in the region R52.

That is, in the operation image GR1, the item image GC2 placed in the region R81 is placed leftward from the item image GC4, which is placed in the region R82, when viewed from the user.

The item image GC1 placed in the region R71 is placed leftward from the item image GC7, which is placed in the region R42, when viewed from the user.

In the operation image GR2, the item image GC1 is placed in the region R72.

In the operation image GR2, the item image GC2 is placed in the region R82.

In the operation image GR2, the item image GC3 is placed in the region R61.

In the operation image GR2, the item image GC4 is placed in the region R81.

In the operation image GR2, the item image GC5 is placed in the region R52.

In the operation image GR2, the item image GC6 is placed in the region R42.

In the operation image GR2, the item image GC7 is placed in the region R41.

In the operation image GR2, the item image GC8 is placed in the region R71.

In the operation image GR2, the item image GC9 is placed in the region R51.

That is, in the operation image GR2, the item image GC2 placed in the region R82 is placed rightward from the item image GC4, which is placed in the region R81, when viewed from the user.

The item image GC1 placed in the region R72 is placed rightward from the item image GC7, which is placed in the region R41, when viewed from the user.

The operation image does not necessarily have a rectangular or circular shape, and may, for example, have an elliptical shape or a polygonal shape, such as a regular hexagonal shape. The shape of the operation image may be changed in accordance with the scene in which the operation image is displayed, the user's preference, and other factors. That is, an operation image having an optimum shape can be displayed in accordance with the situation.

As described above, according to Variation 2, the placement of the plurality of item images GC can be changed in accordance with whether the pointing element includes the right hand H1 or the left hand H2, as in the embodiments and variations described above. That is, the projector can display an operation image GR with excellent operability in accordance with the type of the pointing element and the situation in which the projector is used.

3.3. Variation 3

The aforementioned embodiments and variations have been described by way of example with reference to the case where the pointing element is the right hand H1, the left hand H2, or the pointing element H9, but not necessarily in the present disclosure. For example, the user may use the right or left hand holding an electronic pen as the pointing element. For example, the projector detects the right hand holding the electronic pen as the pointing element including the right hand. Instead, the projector detects the left hand holding the electronic pen as the pointing element including the left hand. Pointing operation performed on any of the item images GC may be performed, for example, by touching the region where the item image GC is displayed with the tip of the electronic pen. Instead, when a cursor that moves in conjunction with the electronic pen is displayed in the projection image GP, and when the cursor is located in any of the item images GC, the user may press a button provided as part of the electronic pen to perform pointing operation on the item image GC.

3.4. Variation 4

In the embodiments and variations described above, the display method and the display apparatus according to the present disclosure have been described by way of example with reference to a projector that projects an image, but not necessarily in the present disclosure. For example, the display apparatus according to the present disclosure is not limited to a projector, and may instead be a direct-view display apparatus. Specifically, the display apparatus according to the present disclosure may include a display panel that displays an image in place of the projection section 15, which projects the projection image GP. More specifically, the display apparatus according to the present disclosure may be an interactive whiteboard that includes a camera capable of capturing an image of the pointing element or communicates with the camera.

What is claimed is:

1. A display method comprising:
   detecting a pointing element; and
   displaying an operation image containing a plurality of item images,
   wherein when the pointing element includes a right hand, the plurality of item images are placed in the operation image based on a first aspect, and
   when the pointing element includes a left hand, the plurality of item images are placed in the operation image based on a second aspect,
   wherein the operation image has a first region and a second region,
   the first region is shifted leftward from the second region when viewed by a user,
   the plurality of item images include an item image relating to a first process and an item image relating to a second process, the method further comprising:
   detecting a pointing position to which the pointing element points;
   executing the first process when the pointing position falls within a region where the item image relating to the first process is displayed;
   executing the second process when the pointing position falls within a region where the item image relating to the second process is displayed; and
   identifying a frequency at which the first process is executed and a frequency at which the second process is executed,
   when the frequency at which the first process is executed is higher than the frequency at which the second process is executed,
   the item image relating to the first process is placed in the first region and the item image relating to the second process is placed in the second region in the operation image in the first aspect,
   the item image relating to the first process is placed in the second region and the item image relating to the second process is placed in the first region in the operation image in the second aspect,
   when the frequency at which the second process is executed is higher than the frequency at which the first process is executed,
   the item image relating to the first process is placed in the second region and the item image relating to the second process is placed in the first region in the operation image in the first aspect, and
   the item image relating to the first process is placed in the first region and the item image relating to the second process is placed in the second region in the operation image in the second aspect.

2. The display method according to claim 1,
   the item image relating to the first process is placed in the first region of the operation image in the first aspect, and
   the item image relating to the first process is placed in the second region of the operation image in the second aspect.

3. The display method according to claim 2,
   the item image relating to the second process is placed in the second region of the operation image in the first aspect, and
   the item image relating to the second process is placed in the first region of the operation image in the second aspect.

4. The display method according to claim 3,
   wherein the operation image in the second aspect is a horizontally inverted version of the operation image in the first aspect.

5. The display method according to claim 1,
   wherein the first process is executed more frequently than the second process.

6. The display method according to claim 1,
   wherein when the pointing element includes none of the right hand and the left hand, the plurality of item images are placed in the operation image based on a third aspect.

7. The display method according to claim 6,
   wherein the operation image further has a third region,
   the first region is shifted upward from the third region when viewed by the user,
   the plurality of item images further include an item image relating to a third process, the method further comprising:

executing the first process when the pointing position falls within the region where the item image relating to the first process is displayed; and executing the third process when the pointing position falls within a region where the item image relating to the third process is displayed, the item image relating to the first process is placed in the first region and the item image relating to the third process is placed in the third region in the operation image in the first aspect, and the item image relating to the first process is placed in the third region and the item image relating to the third process is placed in the first region in the operation image in the third aspect.

8. The display method according to claim 7, wherein the third process is executed more frequently than the first process.

9. A display apparatus comprising
one or more processors programmed to:
detect a pointing element, and
display an operation image containing a plurality of item images,
when the pointing element includes a right hand, the plurality of item images are placed in the operation image based on a first aspect, and
when the pointing element includes a left hand, the plurality of item images are placed in the operation image based on a second aspect,
wherein when the pointing element includes none of the right hand and the left hand, the plurality of item images are placed in the operation image based on a third aspect,
wherein the operation image has a first region, a second region and a third region,
the first region is shifted upward from the third region when viewed by a user,
the plurality of item images include an item image relating to a first process and an item image relating to a third process,
the one or more processors further programed to:
detect a pointing position to which the pointing element points;
execute the first process when the pointing position falls within a region where the item image relating to the first process is displayed; and
execute the third process when the pointing position falls within a region where the item image relating to the third process is displayed,
the item image relating to the first process is placed in the first region and the item image relating to the third process is placed in the third region in the operation image in the first aspect, and
the item image relating to the first process is placed in the third region and the item image relating to the third process is placed in the first region in the operation image in the third aspect.

\* \* \* \* \*